US006692230B2

(12) United States Patent
Selsam

(10) Patent No.: US 6,692,230 B2
(45) Date of Patent: Feb. 17, 2004

(54) BALANCED, HIGH OUTPUT, RAPID ROTATION WIND TURBINE (WEATHERVANE MULTI-ROTOR WINDMILL)

(75) Inventor: Douglas Spriggs Selsam, 2600 Porter Ave. Unit B, Fullerton, CA (US) 92833

(73) Assignee: Douglas Spriggs Selsam, Fullerton, CA (US)

( * ) Notice: Subject to any disclaimer, the term of this patent is extended or adjusted under 35 U.S.C. 154(b) by 0 days.

(21) Appl. No.: 09/997,499

(22) Filed: Nov. 23, 2001

(65) Prior Publication Data

US 2002/0192070 A1 Dec. 19, 2002

Related U.S. Application Data

(63) Continuation-in-part of application No. 09/881,511, filed on Jun. 14, 2001.

(51) Int. Cl.$^7$ .................................................. F03D 1/02
(52) U.S. Cl. .................................................. 416/132 B
(58) Field of Search ........................ 419/132.13, 132 R, 419/131, 134 R, 135, 139, 141, 148, 176, 177, 227 R, 85, 84, 86

(56) References Cited

U.S. PATENT DOCUMENTS

| 996,309 | A | * | 6/1911 | Carlson | 416/197 |
| 1,504,259 | A | * | 8/1924 | Miller | 416/197 |
| 3,942,026 | A | * | 3/1976 | Carter | 416/198 |
| 3,944,839 | A | * | 3/1976 | Carter | 416/198 |
| 4,065,225 | A | * | 12/1977 | Allison | 416/121 |

* cited by examiner

Primary Examiner—Edward K. Look
Assistant Examiner—Igor Kershteyn

(57) ABSTRACT

Multiple horizontal axis rotors are coaxially attached, at spaced intervals, to an elongate driveshaft, which is aimed at a slightly offset angle from the wind direction, exposing each rotor to fresh wind. That offset angle may be in the vertical plane, horizontal plane, or oblique. The shaft is held by bearings near its midsection, and drives a load, such as an electrical generator. This assembly is allowed to pivot about the vertical axis of a supporting tower, and may be actively or passively aimed, in response to wind direction and velocity. Multiple driveshafts may be mounted on a single pivoting support frame. Multiple small rotors weigh less for the same swept area than an equivalent larger rotor, are easier to manufacture and transport, and rotate faster, transmitting the same power at less torque, more closely matching the required rpm of a generator, reducing or eliminating the need for ratio gearing.

27 Claims, 18 Drawing Sheets

BALANCED, HIGH OUTPUT, RAPID ROTATION WIND TURBINE (WEATHERVANE MULTI-ROTOR WINDMILL)

(This patent application is a continuation in part of U.S. patent application Ser. No. 09/881,511 (Filing Date Jun. 14, 2001))

BACKGROUND

This invention relates to wind turbines.

PRIOR ART

Conventional horizontal axis wind turbines suffer from certain drawbacks, some of which are:

1. High Mass of Large Rotors:

The mass of a rotor increases as function of the diameter cubed, while the swept area only increases as a function of the diameter squared. The amount of wind captured, per unit rotor mass, is therefore inversely proportional to rotor diameter. The single large rotor captures less wind per unit mass than a plurality of smaller rotors sweeping an equivalent area would. Such a single, large, heavy rotor also mandates the use of a commensurately stronger drivetrain and tower to support its ponderous weight.

2. Slow Rotation Rate of Large Rotors:

Today's windmills, with their single large, slowly turning rotor require either a specially built, slow-speed alternator or generator, or a transmission means providing ratio gearing, such as a gearbox, to bring the rotation rate up to a speed compatible with a generator. Either solution is complicated, expensive, and heavy, adding to the cost of the installation, as well as the strength required of the supporting tower.

For a given wind speed, the tip speed of similarly shaped rotors is substantially the same, regardless of diameter. The rotational rate is therefore inversely proportional to rotor diameter, meaning that a smaller rotor spins faster to maintain the same tip speed as a larger, more slowly rotating set of blades. Conventional generators and alternators typically require such a fast rotation rate for efficient operation. Small rotors, turning more quickly, can therefore often directly drive a substantially standard alternator or generator without ratio gearing, or a transmission. With smaller rotors, if a transmission is required, it need incorporate less ratio gearing, and may therefore be less substantial, since the rotational rate of a smaller rotor is faster to begin with.

3. Faster Rotation Delivers the Same Power at Lower Torque:

A given amount of power is delivered at lower torque by a faster rotating shaft, further reducing the required robustness, and therefore the cost and weight, of the drivetrain.

4. Low Power Output from Smaller Rotors in Prior Art:

Though smaller rotors are desirable from the standpoint of achieving a higher rotation rate, the amount of wind power available from the area swept by a smaller rotor is less than that of a larger rotor, being proportional to the diameter squared. Conventional windmills having a single small rotor therefore require high winds for useful amounts of energy to be generated.

Many schemes have been put forward in the prior art to mechanically harness a multiplicity of smaller rotors together to power a single load. None has proven to be simple and reliable enough to have enjoyed commercial success. Prior art designs utilizing a multiplicity of rotors coupled to a single shaft disposed these rotors closely together, and directly in line with the wind, and had no means for supplying fresh wind to each rotor, and therefore suffered from excessive wind shadow effects between rotors, making the redundancy of multiple rotors largely ineffective, non-advantageous, and indeed, burdensome and unworkable.

5. A dedicated azimuthal orientation means is normally required to keep a conventional upwind rotor properly aimed into the wind. This directional orientation means normally comprises either downwind fluid reaction surfaces, such as a tail fin, or an active directional control mechanism. Either solution adds extra cost, weight, wind resistance, and complication to an installation, while not otherwise contributing to power generation.

6. Safety Issues:

It is possible for virtually any wind turbine to undergo structural failure at some point in its service life. With tip speeds often-exceeding 150 mph (~mach 0.2), the ponderously large blades of conventional wind turbines store a tremendous amount of kinetic energy, and are known to be very dangerous if broken or detached, even in home installations. These huge rotor blades, (with a mass proportional to the diameter cubed, even though the power collected is only proportional to the diameter squared) often require a heavyduty crane to be lifted into place. On the average one person dies every year in such operations.

7. Vibration issues: Prior art turbines are known to transmit low frequency vibration to structures upon which they are mounted, often making rooftop mounting inadvisable.

8. Noise issues:

Conventional windmills with a single rotor often produce noise in high winds, which may be objectional in residential areas.

The invention presented in U.S. patent application Ser. No. 09/881,511 by this inventor addresses and solves these drawbacks of prior art. That invention as disclosed, in several of its main embodiments, places a multiplicity of substantially conventional horizontal axis rotors at spaced intervals along a single, semi-flexible tower/driveshaft. This tower/driveshaft protrudes from its base into the windstream, naturally bending downwind to properly orient the rotors for power generation. The entire structure is caused to spin along its longitudinal axis, transmitting useful power to the base using only a single moving part. The coupling of multiple rotors achieves a high rate of rotation, with more total power than single rotor designs. This high power is delivered at a fast rate of rotation, and therefore at low torque, allowing the shaft to be less substantial than it would need to be to deliver the same power at a slower rate of rotation. The present invention addresses two challenges inherent in this previous design, as disclosed by this inventor:

1. Stress on the Tower/Driveshaft:

In certain embodiments, the tower/driveshaft of this previously disclosed invention protrudes substantially perpendicular to the wind direction, and must then bend downwind to properly orient the rotors. This tower/driveshaft must support the weight of the rotors, resist the force of the wind thereupon, and transmit the rotational torque generated thereby to the base, all while spinning about its longitudinal axis, while in a bent configuration. This transmission of torque by a shaft that is both spinning and bent under load is very stressful to the shaft.

2. Stress on the Cantilevered Bearing Means:

The downwind forces exerted on the multiple rotors and their supporting tower/driveshaft, by the wind, and by their weight, as transmitted through the leverage afforded by the length of the tower/driveshaft, result in large radial loading upon the bearings of the cantilevered bearing means at the base.

BRIEF SUMMARY OF THE INVENTION

The present invention is a modified, more balanced version of the invention disclosed in U.S. patent application Ser. No. 09/881,511. In that disclosure, the rotating tower/driveshaft served to elevate the rotors, and bent downwind to properly orient them. The present invention retains the support, such as a stationary tower, of a conventional wind turbine, while nonetheless preserving several of the advantages of the embodiments disclosed in U.S. patent application Ser. No. 09/881,511.

In this new, more balanced version, the driveshaft extends both forward, substantially into the direction of the wind, as well as backward, or substantially downwind. This more balanced configuration involves less leverage, and results in less stress on the cantilevered bearing means, less stress on the shaft, as well as requiring less bending of the shaft. The entire assembly is mounted on a conventional support means, such as a tower, building, tree, pole, or other elevating structure. Since the shaft protrudes in two directions from the cantilevered bearing means, the stress on the shaft is automatically cut at least in half. Since no part of the driveshaft is acting as the tower, leverage and stresses on the shaft are further reduced. And since the length of shaft presented is more parallel to the wind, bending stresses on the shaft are even further dramatically reduced.

The direction of projection of the shaft, while having a major component substantially parallel to the wind, may be offset from the actual wind direction in an amount sufficient to allow an intermixture of fresh, undisturbed wind into the disk swept by each succeeding rotor, so that each rotor may effectively harness wind energy without undue disturbance from upwind rotors, and substantially contribute toward the overall rotation of the shaft.

Some advantages of the embodiments of the previously disclosed invention, in common with the invention disclosed herein are:

1. Lighter rotor weight:
   A multiplicity of smaller rotors weighs less than a single larger rotor sweeping an equivalent total area. This is because the mass of a rotor is proportional to the third power of the diameter (diameter cubed), while the area swept is only proportional to the second power of the diameter, (diameter squared). The larger the rotor, the less wind it can capture relative to its mass.
2. Faster rotation:
   For a given rotor type, in a given wind speed, the tip speed is basically some multiple of the wind speed, independent of rotor diameter. Therefore, smaller rotors rotate at a faster rate (rpm) than larger rotors. The multiplicity of smaller rotors of the present invention has a faster rate of rotation (rpm) than a single larger rotor of equivalent swept area. Since electrical generators perform best at such a relatively high rate of rotation (rpm), the present invention more closely matches the desired rotation rate (rpm) of current electrical generating equipment. This means that a gearbox is either not needed, or, if needed, may be less substantial than would be the case with a single, large, slowly spinning rotor with its commensurate high torque. One version of the present invention even takes advantage of counter-rotating sets of rotors, and their differential relative rate of rotation, which essentially doubles the effective rate of rotation.
3. Lighter Duty Drivetrain:
   A faster-rotating driveshaft can transmit the same power at less torque than a more slowly rotating driveshaft. Since the present invention rotates faster, torques are lower, requiring a less substantial drivetrain. This lowers cost, as well as further lowering overall weight.
4. Self-Aiming Behavior:
   The previously disclosed invention was a downwind machine.
   The present invention, can easily be configured as a self-orienting, semi-downwind machine, either by having more rotors downwind than upwind of an azimuthal pivot point, or by giving the downwind rotors more leverage, spaced further from the pivot point, so that the windmill naturally points into the wind, in the fashion of a weathervane.
5. Safety:
   Multiple smaller rotors store less kinetic energy than equivalent larger ones. This translates to less danger should mechanical failure occur.
6. Vibration:
   The low frequency vibrations associated with larger rotors are reduced or eliminated with multiple smaller rotors, making rooftop installations more practical.
7. Noise:
   The multiple small rotors will have different noise characteristics, in high winds, than single larger ones, and may therefore be less objectionable to nearby residents. Some advantages that the embodiments disclosed herein have over the previously disclosed embodiments of U.S. patent application No. 09/881,511 are:
   1. Since the shaft protrudes in two directions from the cantilevered bearing means, the stress on the shaft is automatically cut at least in half in the present invention.
   2. Since no part of the driveshaft is acting as the tower, the overall length of the shaft, as well as leverage and stresses on the shaft are further reduced.
   3. Since the length of shaft presented is more parallel to the wind, bending stresses on the shaft are even further dramatically reduced, because the wind has less leverage.
   4. The radial loads on the bearings are dramatically reduced, since the windmill is largely balanced about the bearings, since the driveshaft protrudes therefrom in both directions.

Some disadvantages associated with this new design are:
   1. We give up the "single moving part" of the previous design, assuming that the present invention is mounted with directional freedom.
   2. We must use a conventional elevated mount, such as a tower.
   3. We give up having the load located at ground level.
   4. We give up having a non-rotating load—that is, in this case, the orientation of the load changes depending on wind direction, meaning that a simple power cable from the load to the ground could eventually become twisted too far in one direction, so accommodations must be made for that fact; a means, such as slip rings, or a cable that can be unplugged, untwisted, then re-plugged in, must be used for transmitting power to the ground, unless the installation happens to be in a location where the wind never changes direction, or the installation is hard-mounted in a certain direction, or an active aiming mechanism is used, so that the cable may be untwisted at will automatically by rotating the orientation of the assembly on the tower.

Figure 4:
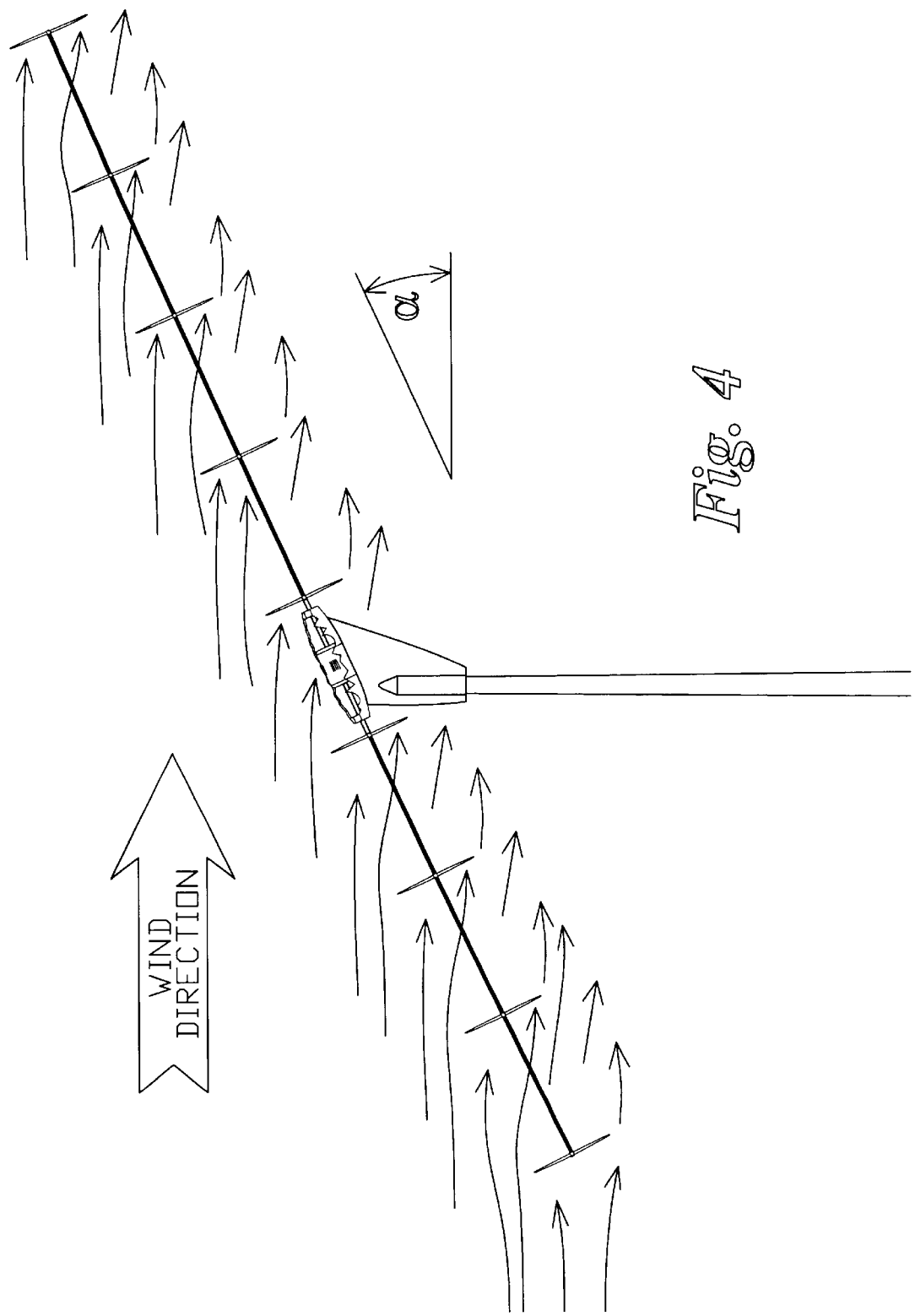
FIG. 4 Shows a side view of the tenth embodiment, and attempts to depict the flow of fresh wind to each rotor, by virtue of the distance between rotors, and the offset angle of the driveshaft from the wind direction.

PART NUMBERS IN THE DRAWINGS FIGURES 4 bearing support means
5 cantilevered bearing means
6 load
10 elongate driveshaft
11 bearing
13 horizontal axis type rotor
15 axle
27 resilient spring means
34 damping means (shock absorber)
35 horizontally rotatable azimuthal directional orientation means
36 elevation angle control means
37 lifting mechanism
38 pivot means
49 upwind section of the driveshaft
50 downwind section of the driveshaft
67 ballast counterweight means
90 tower means
91 outer rotating half of load 6
92 inner rotating half of load 6 (turns in opposite direction of 91)
93 supporting armature means
94 fluid reactive offset angle inducing means
95 downwind offset extension means
96 active azimuthal directional orientation control means
97 streamlined mounting pylon
98 streamlined nacelle
A horizontal distance that the driveshaft projects upwind
B horizontal distance that the driveshaft projects downwind if different from A
α offset angle from wind direction, (becomes simply the elevation angle if the angular offset is solely from the horizontal)

DETAILED DESCRIPTION OF THE INVENTION

Figure 7:
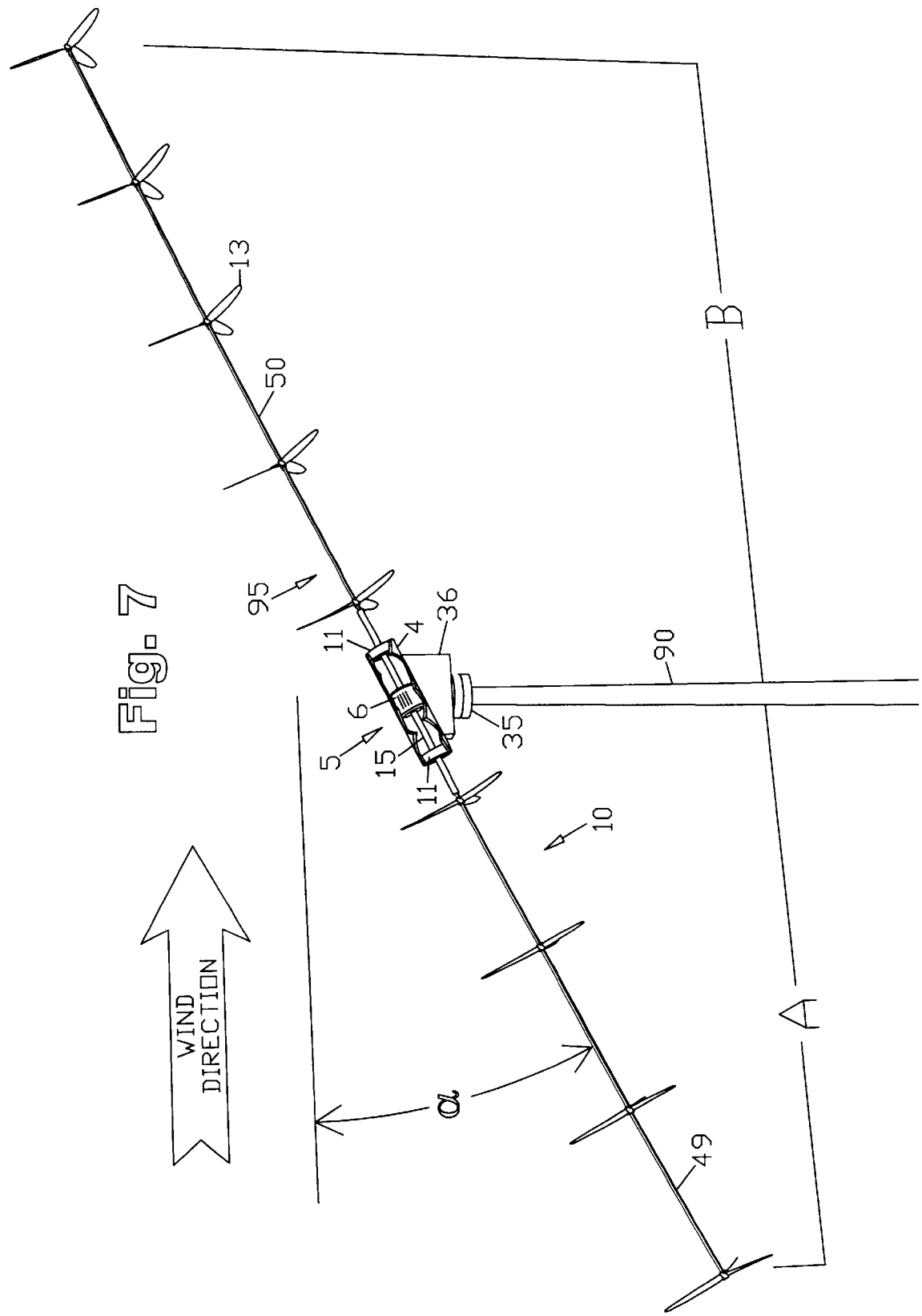
FIG. 7 Shows an oblique side view of a passively aimed wind turbine installation of the first embodiment.
Figure 8:
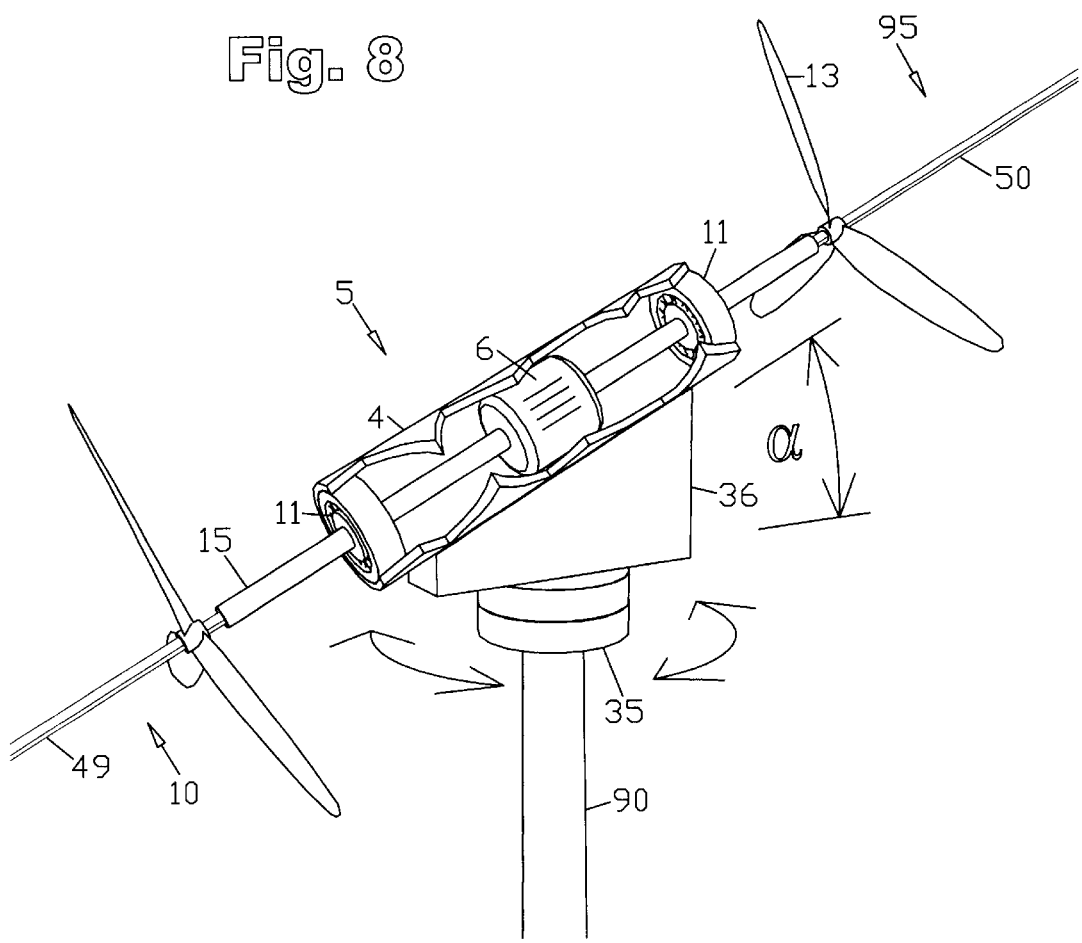
FIG. 8 Shows a closeup view of the cantilevered bearing means, load, and azimuthal orientation means of the first embodiment, as mounted atop a tower.

1. First Embodiment, FIGS. 7 and 8:

A plurality of substantially horizontal axis type rotors 13 are coaxially mounted, at spaced intervals, along an elongate driveshaft 10. The driveshaft is substantially aligned with the wind, but at an offset angle α, to allow each rotor to encounter at least some airflow substantially undisturbed by upwind rotors, as illustrated in FIG. 4. In this case the offset angle α is in the vertical plane. The driveshaft protrudes in a freely rotating manner from each end of a cantilevered bearing means 5, and drives a load 6, mounted thereto. This driveshaft/bearing/load combination is aimed into the wind much like a weather vane, being mounted on a horizontally rotatable azimuthal directional orientation means 35, which is in this case essentially a horizontally rotatable pivot, that functions like a turntable. In this embodiment there are five rotors mounted on the downwind section 50 of the driveshaft, and only four rotors along the upwind section 49 of the driveshaft. The horizontal distance B that the driveshaft projects downwind is also substantially greater than the horizontal distance A that the driveshaft projects upwind. (Note that foreshortening in the perspective view of FIG. 6, may affect the viewer's casual perception of this difference in length, making it appear to be less than it is. A true side view of a similar turbine is seen in FIG. 4)

The longer end of the driveshaft with five rotors is blown downwind because:

Five rotors present more wind resistance than four.

The longer end with five rotors also has more leverage. (This extra length of the downwind section of the driveshaft comprises a downwind offset extension means 95.)

The downwind rotors also are higher than upwind rotors, and therefore encounter the higher wind speeds found at higher altitude, and are therefore more forcefully blown downwind thereby.

The operative principle is not the exact number of rotors, nor their exact distance upwind or downwind, but the fact that some predominance of downwind rotors, in sheer number and/or the leverage that they exert, and/or the extra force exerted upon them by virtue of higher altitude, will produce automatic downwind orientation behavior, in the fashion of a weathervane.

The cantilevered bearing means 5 is mounted atop the horizontally rotatable azimuthal directional orientation means (horizontal pivot) 35 at a slope, or offset angle α from the horizontal plane, as determined by an elevation angle control means 36, which in this case is a wedge-shaped support, and is naturally guided by the wind to a position azimuthally substantially aligned with the wind. The entire assembly is mounted atop an elevated support means, such as the conventional tower means 90 of the drawing figures.

The nose, or upwind section 49 of the driveshaft, extending substantially into the wind, also points slightly downward, toward the ground, at offset angle α from the horizontal plane. The tail, or downwind section 50 of the driveshaft is blown, and caused to be aimed, substantially downwind, and yet projects slightly upward, toward the sky, at offset angle α from the horizontal plane, as well. The rotors are separated sufficiently that, with the shaft projecting at an offset angle α from the wind direction, there is sufficient distance from one rotor to the next to allow at least a substantial portion of each rotor disk substantial access to a relatively undisturbed airflow. In other words, the shaft is tilted enough to significantly reduce wind shadow effects from one rotor to the next, but not so much that the rotors cease to function efficiently, with enough distance between the rotors to facilitate such an optimal zone of behavior. This offset angle α is in the vertical plane, in this case. The cantilevered bearing means 5 is comprised of two bearings 11, and a bearing support means 4 (shown here as a simple tube, in a cutaway view). An axle 15 freely rotates within the bearings, and supports the driveshaft 10. This assembly may be fashioned, for example, with the axle 15 being hollow, and the driveshaft inserted therein. The driveshaft may even extend completely therethrough, in an uninterrupted fashion. The driveshaft may also be sufficiently robust to be directly mounted in the bearings, without being held by an axle; indeed as the two may be fashioned as a single unit, there need not be any distinction between them.

The offset angle α need not be exclusively in the vertical plane. An offset in the horizontal plane, or at an oblique angle, or even no offset angle at all, are also possible within the scope of the present invention. Indeed, the aim of such a vertically slanted turbine may tend to naturally drift to one side, resulting in just such an oblique angle.

The load 6 is shown as an electrical generator, but could comprise any mechanical load.

This wind turbine weighs less than prior art turbines, and rotates faster, due to having smaller rotors. The faster rotation lowers torque, and eliminates or reduces the need for ratio gearing, further reducing weight and cost.

Since wind shadow effects increase with increasing wind speed, upwind rotors will partially shield downwind rotors in excessively high winds, helping to prevent damage.

The downwind section 50 may additionally bend in higher winds, further aligning the rotors with the wind, and shielding downwind rotors.

If the offset angle α is reduced so as to be substantially equal to zero, then the amount of fresh wind encountered by each rotor is reduced to that amount allowed to enter the stream by virtue of the distance between rotors. This lowers the available power but may protect the turbine in excessively high winds.

While the rotors illustrated have three blades, other numbers of blades are permissible, within the scope of the present invention. For example the turbine of FIG. 3 has two-bladed rotors, sequentially offset by 90 degrees. This principle is true of all embodiments disclosed herein; any reasonable number of blades per rotor is possible, although two or three blades are well known in the art to be able to extract most of the available energy in a windstream. Typically, the faster the desired rate of rotation, the fewer blades per rotor are called for.

Figure 9:
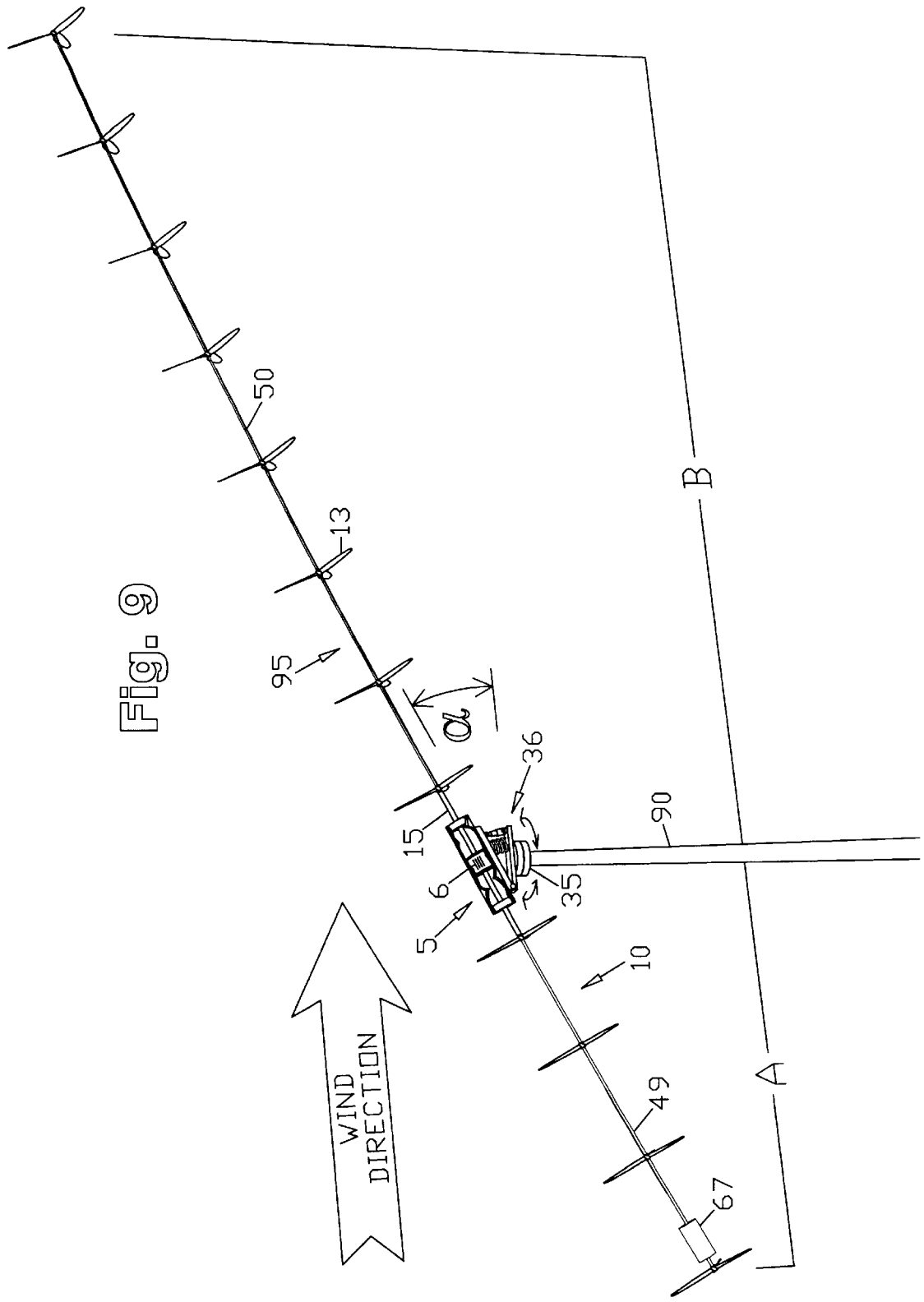
FIG. 9 Shows an oblique side view of a passively aimed wind turbine installation of the second embodiment, with counterweighted upwind section of the driveshaft.
Figure 10:
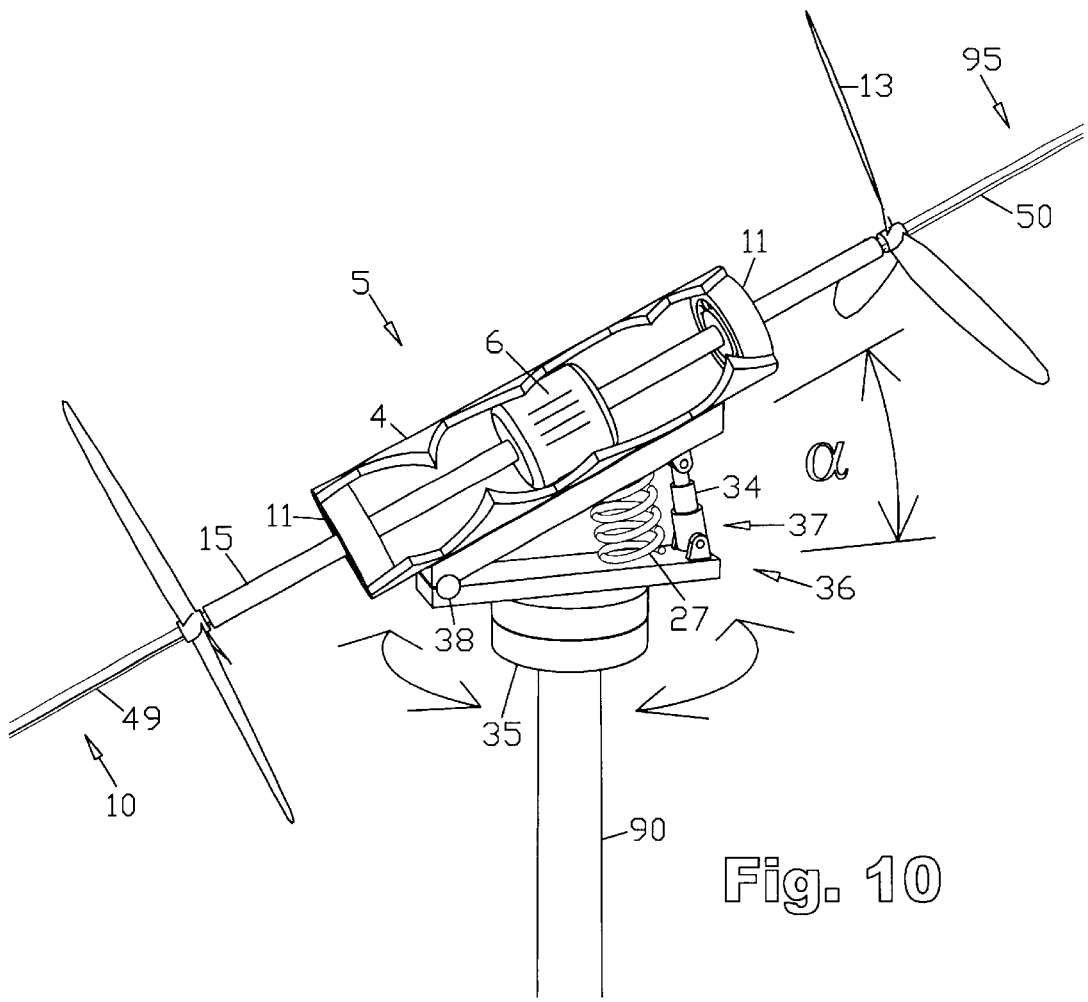
FIG. 10 Shows a closeup view of the cantilevered bearing means, load, resilient elevation angle control means, and azimuthal orientation means of the second embodiment, as mounted atop a tower.

2. Second Embodiment, FIGS. 9 and 10:

The second embodiment is similar to the first embodiment, but with the downwind section 50 of the driveshaft being much longer than the upwind section 49 of the driveshaft, so that the downwind distance B is much greater than the upwind distance A. There are also many more rotors mounted along this longer downwind section. The weight of these additional rotors, and this extra length of shaft, as amplified by the leverage afforded by this additional length, are at least partially counterbalanced by a ballast counterweight 67, mounted to the upwind section 49 of the driveshaft. It should be noted that the upwind section 49, being pointed into the wind, may be constructed more robustly than the downwind section. Such stronger construction may be sufficiently heavy to act as a counterweight by itself, without the addition of a dedicated weight.

The horizontal, or azimuthal component of the aim, is again controlled by the natural force of the wind causing lateral rotation of the cantilevered bearing means 5 and its projecting driveshaft 10 about horizontally rotatable azimuthal directional orientation means 35 (a horizontally rotatable pivot), upon which the cantilevered bearing means 5 is itself supported. The extra downwind length of the driveshaft comprises a downwind offset extension means 95, which causes this passively oriented turbine to be aimed into the wind in the fashion of a weathervane. The vertical component, or elevation angle, is controlled by an elevation angle control means 36, which in this case comprises a lifting mechanism 37, that supports the upper end of the bearing support means 4, the tubular enclosure that securely retains the bearings. This tubular bearing support means 4 pivots about a pivot means 38 at its lower end. The action of this elevation angle control means 36 may be resilient in nature, and/or may be actively controlled, and/or may be configured to have a shock absorbing action. The lifting mechanism chosen for this embodiment comprises a resilient spring means 27, as moderated by a damping means 34 such as a shock absorber. In excessively strong winds the downwind section is blown further downwind, rotating it lower, so that the spring is compressed. The action of this protective mechanism places the rotors more in line with the wind, so that they tend to shield one another from the full force of the wind, preventing overspeed, and thereby limiting damage from high winds.

The elevation angle control means 36 may be so configured that the action of this elevation angle control means 36 may comprise one or more of the following:

- The action may be elastic, or resilient in nature, with lifting mechanism 37 configured to have the action of a spring, with such resilient mechanisms being well known in the art of machinery.
- The action may be actively controlled, with lifting mechanism 37 having features or properties known in the art that allow it to be actively adjusted.
- It may also be configured to have a dampening, or shock absorbing action, many mechanisms for which are also known in the art.
- It may be configured to simply have no movement in the vertical plane, that is a static arrangement, at some constant offset angle, as in the first embodiment.
- It may be configured to remain at a constant angle, but be adjustable.
- The counterweight may be eliminated, at the expense of increased radial loading on the bearings, and increased stress on the elevation angle control means.

The exact lifting mechanism 37 and pivot 38 shown are exemplary only, serving to illustrate the point that elevational aim may be influenced in general. Many simple alternative mechanisms known in the art may be adapted to comprise the elevation angle control means 36.

Figure 11:
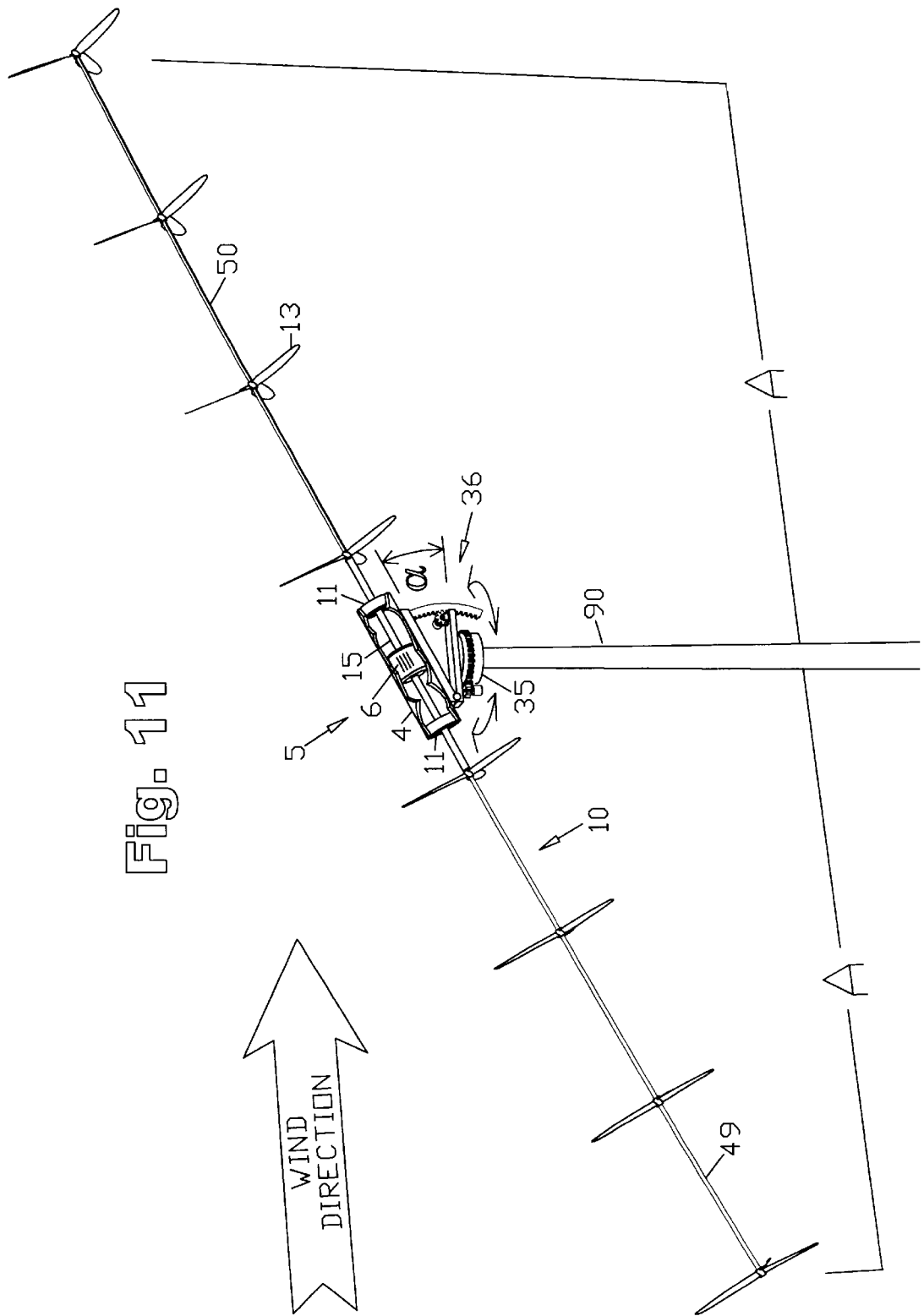
FIG. 11 Shows an oblique side view of an actively aimed wind turbine installation of the third embodiment.
Figure 12:
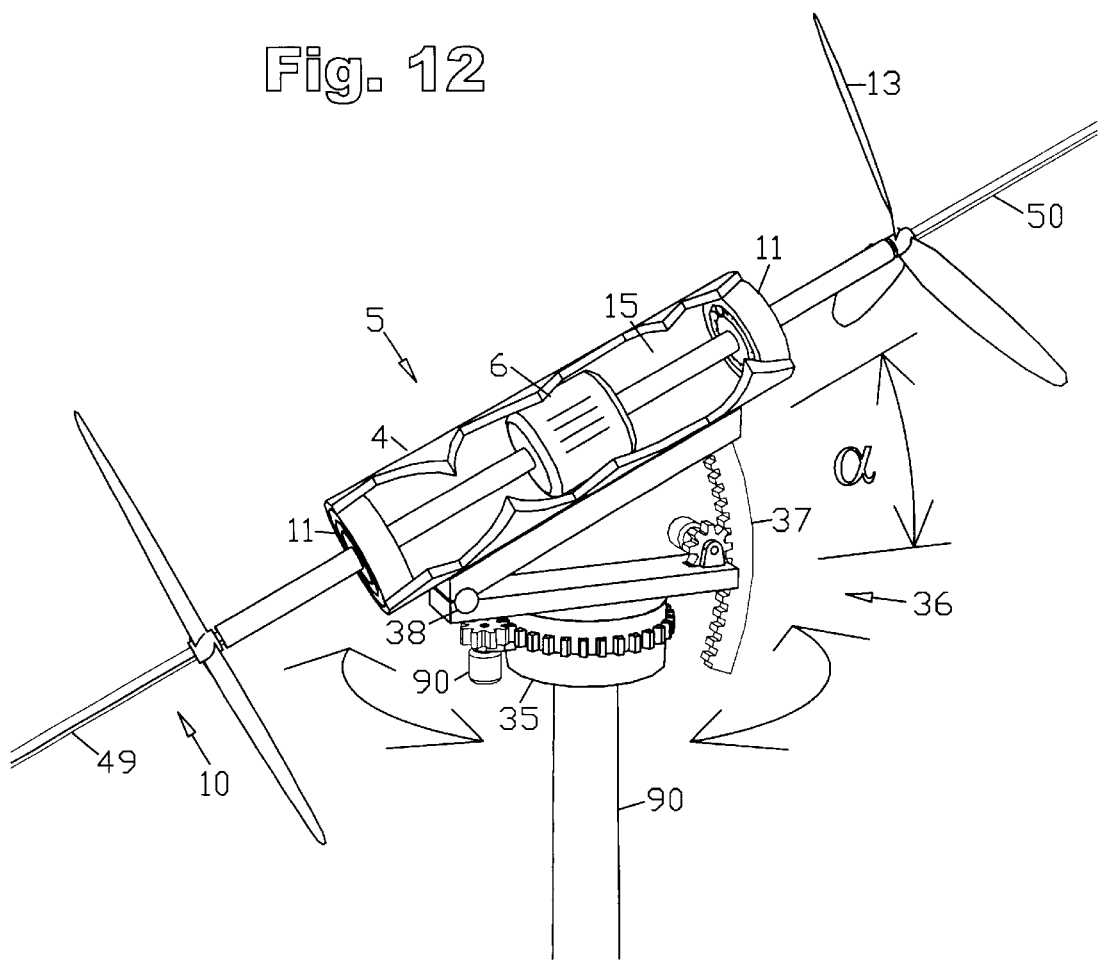
FIG. 12 Shows a closeup view of the cantilevered bearing means, load, actively controlled elevation angle control means, and actively controlled azimuthal orientation means of the third embodiment, as mounted atop a tower.

3. Third Embodiment, Balanced Configuration, Active Elevation Angle Control Means, Active Azimuthal Angle Control Means; FIGS. 11 and 12:

The Third Embodiment is similar to the First and Second Embodiments, except that it has an equal number of upwind rotors and downwind rotors. The horizontal distance A that the driveshaft projects downwind is substantially equal to the horizontal distance A that it projects upwind. This is not a downwind machine, nor an upwind machine, but a perfectly balanced wind turbine; Rather than being automatically steered by the wind, it is provided with directional control. In this case the direction of azimuthal directional orientation means 35 is actively controlled by active azimuthal directional orientation control means 96, illustrated here as a simple gear drive. Many means for such active directional control are well known in the art. The elevation angle is also actively controlled by elevation angle control means 36, here, as in the previous embodiments comprising a lifting mechanism 37, that supports the upper end of the bearing support means 4, the tubular enclosure that securely retains the bearings. This tubular bearing support means 4 pivots about a pivot means 38 at its lower end. The lifting mechanism 37, being actively controlled in this embodiment, is graphically represented as a simple gear drive unit.

- An advantage of this embodiment over the first two embodiments is reduced radial loading on the bearings, since the driveshaft is well balanced thereabout.
- A further advantage is that power may be transmitted to ground level by a simple cable, rather than slip rings, since the active azimuthal directional orientation control means 96 can be used to keep a power cable from becoming excessively twisted in one direction.
- This arrangement is capable of generating an offset angle α in either the vertical plane, the horizontal plane, or obliquely, by a combination of horizontal and vertical adjustment.

Figure 13:
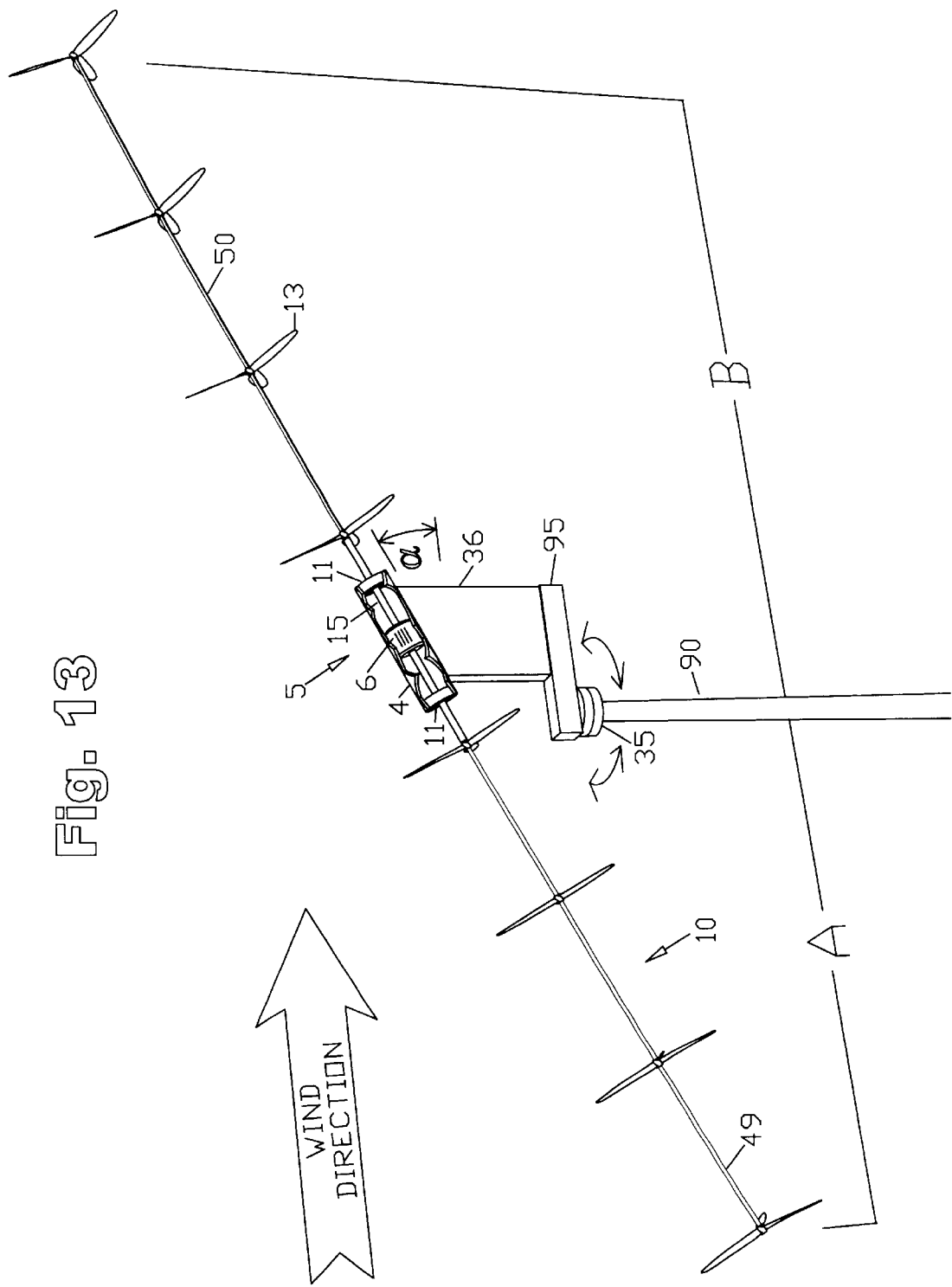
FIG. 13 Shows an oblique side view of a passively aimed wind turbine installation of the fourth embodiment, featuring a dedicated downwind offset extension means.

4. Fourth Embodiment: Balanced Mounting Downwind of Azimuthal Pivot; FIG. 13:

As in the previous embodiment, the upwind and downwind portions 49, 50 of the driveshaft 10 are of equal length, with an equal number of upwind and downwind rotors 13, so that the driveshaft and attached rotors are balanced about the bearings, reducing radial loading thereupon. Here, the cantilevered bearing means 5 and elevation angle control means 36 are mounted to downwind offset extension means 95, which acts to support them downwind of horizontally rotatable azimuthal directional orientation means 35, about which this entire assembly pivots in the horizontal plane. Distance B, that the driveshaft projects downwind from the center of rotation of horizontally rotatable azimuthal directional orientation means 35, is greater than distance A that it projects upwind, due to the downwind horizontal projection of downwind offset extension means 95. The assembly is naturally blown downwind of the pivot point. This is, therefore, a downwind, passively oriented machine, even though the driveshaft 10 projects in equal distances upwind, and downwind, from the cantilevered bearing means 5.

- The horizontally rotatable azimuthal directional orientation means 35 can be located at any height on the tower, with the tower divided into two sections, above and below, the upper section coaxially pivoting atop the lower section. In this case the upper section of the tower may even bend or project to one side, and thereby be coincident with downwind offset extension means 95, as in the eleventh embodiment, illustrated in FIG. 5.
- The horizontally rotatable azimuthal directional orientation means 35 may also be located at the bottom of the tower, within the scope of this embodiment, so that the entire installation, including tower, rotates as a unit.
- An advantage that this embodiment shares with the third embodiment over the first two embodiments is reduced radial loading on the bearings, since the driveshaft is well balanced thereabout.
- An advantage of this embodiment over the third embodiment is that it is a downwind machine, passively aimed, requiring no active directional control.

Figure 14:
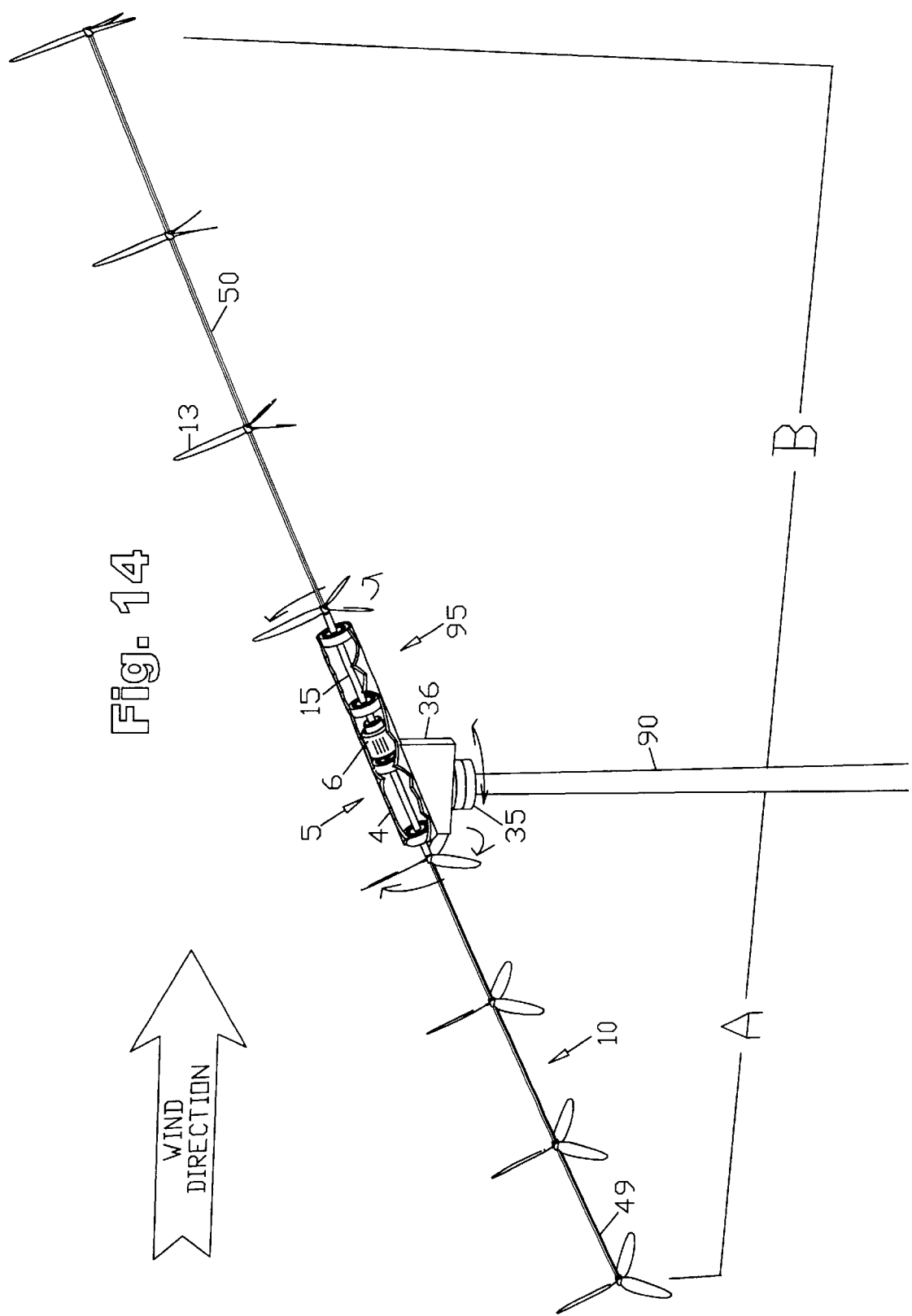
FIG. 14 Shows an oblique side view of a passively aimed wind turbine installation of the fifth embodiment, with counter-rotating rotors driving two counter-rotating halves of the driveshaft, driving two counter-rotating halves of a load.
Figure 15:
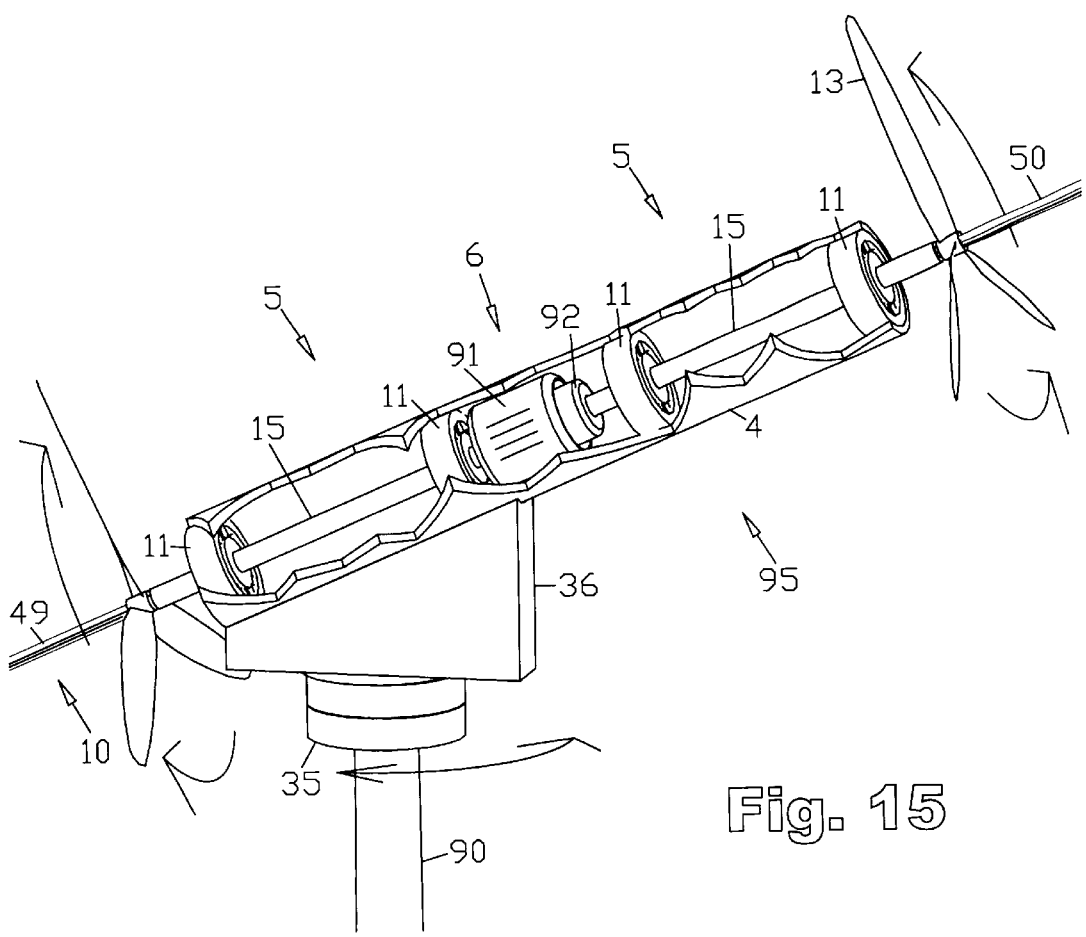
FIG. 15 Shows a closeup view of the cantilevered bearing means of the fifth embodiment, with two counter-rotatinig halves of the load, as mounted atop a tower.

5. Fifth Embodiment: Counter-rotating, Balanced Downwind Mounting; FIGS. 14, 15:

The driveshaft is physically divided into two counter-rotating halves, the upwind half 49, and the downwind half 50. The upwind half rotates clockwise as seen from downwind, and the downwind half rotates counterclockwise. In FIG. 15 we can see that the load 6 is also divided into counterrotating halves, an outer half 91, which, being driven by the upwind section 49 of the driveshaft, rotates clockwise, and an inner half 92 which rotates counterclockwise with the downwind section 50 of the driveshaft. It is easy to see that the effective relative rate of rotation of the two halves 91, 92 of the load is approximately doubled by this counterrotation. This faster rate of relative rotation is desirable from the standpoint that electricity is more readily generated by most contemporary alternators and generators at such a faster rotation rate, with gearboxes usually being employed to achieve such a faster rate. There are two separate cantilevered bearing means 5 within the single bearing support means 4, supporting two separate counter-rotating axles 15.

As in the previous embodiment, while the driveshafts, in aggregate, are balanced about the bearing support means 4, the entire assembly is shifted downwind of horizontally rotatable azimuthal directional orientation means 35 (the horizontally rotatable pivot). Here, the elongate, tubular, bearing support means 4, being mounted to elevation angle control means 36 in an offset manner, serves the function of downwind offset extension means 95, and is so labeled. Such an offset configuration is passively self-aiming, even though the upwind section 49 and the downwind section 50 of the driveshaft are the same length, with an equal number of rotors upwind and downwind.

An advantage of this embodiment is a faster effective relative rotation rate of the load, since it is divided into counter-rotating halves.

A disadvantage is increased radial loading on the bearings, since each half of the driveshaft is supported in a fully cantilevered manner therefrom, rather than being balanced as a single unit about the bearings.

Figure 16:
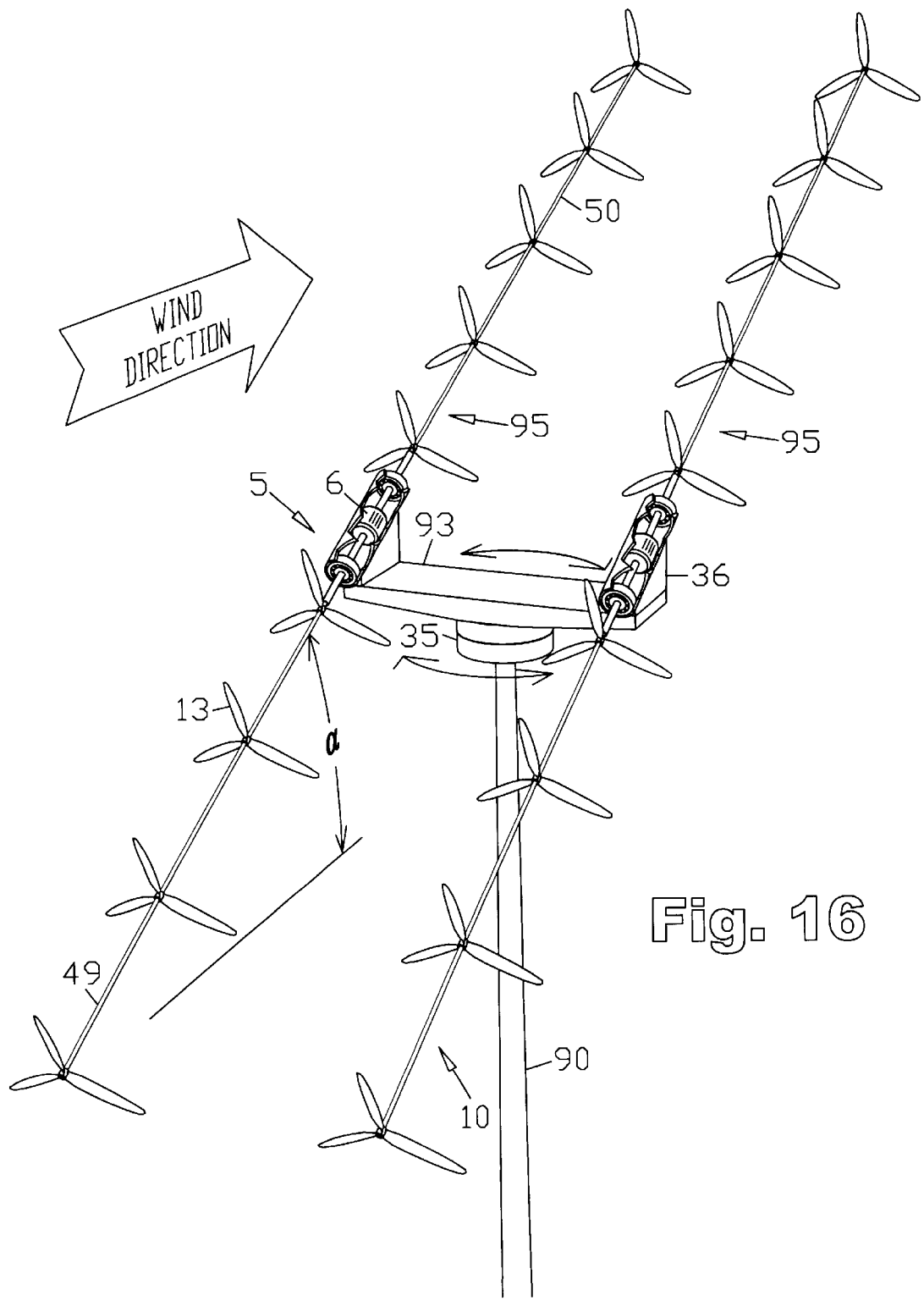
FIG. 16 Shows an oblique front view of the passively aimed wind turbine installation of the sixth embodiment, having two driveshafts with attached rotors, mounted to a single pivoting frame.

6. Sixth Embodiment: Multiple Driveshafts Mounted on a Rotating Frame; FIG. 16:

This embodiment is similar to the first embodiment, except that in this embodiment, a multiplicity of separate driveshafts, here illustrated as two, are supported upon a rotating frame comprising supporting armature means 93. Here each driveshaft 10 has more downwind rotors than upwind rotors, as in the first embodiment, making this a passively oriented downwind machine. The extra length of each downwind section 50 of the driveshafts 10 comprise downwind offset extension means 95, which causes this machine to aim itself into the wind in the manner of a weathervane.

This same passively oriented downwind behavior can also be accomplished with perfectly balanced driveshafts, having the same number of upwind and downwind rotors, if the supporting armature means 93 comprises a downwind offset extension means 95, such as disclosed in the fourth embodiment.

As illustrated, each driveshaft powers its own separate load, although the rotation of both driveshafts may alternatively be mechanically coupled to drive a single load, within the scope of this embodiment. Means for such mechanical coupling are well known in the art of machinery.

The two driveshafts with their attached rotors may be configured to counter-rotate. This eliminates any residual torque imbalances in the machine.

A number, different than two, of separate driveshafts 10 may be supported by the supporting armature means 93, within the scope of this embodiment.

Figure 17:
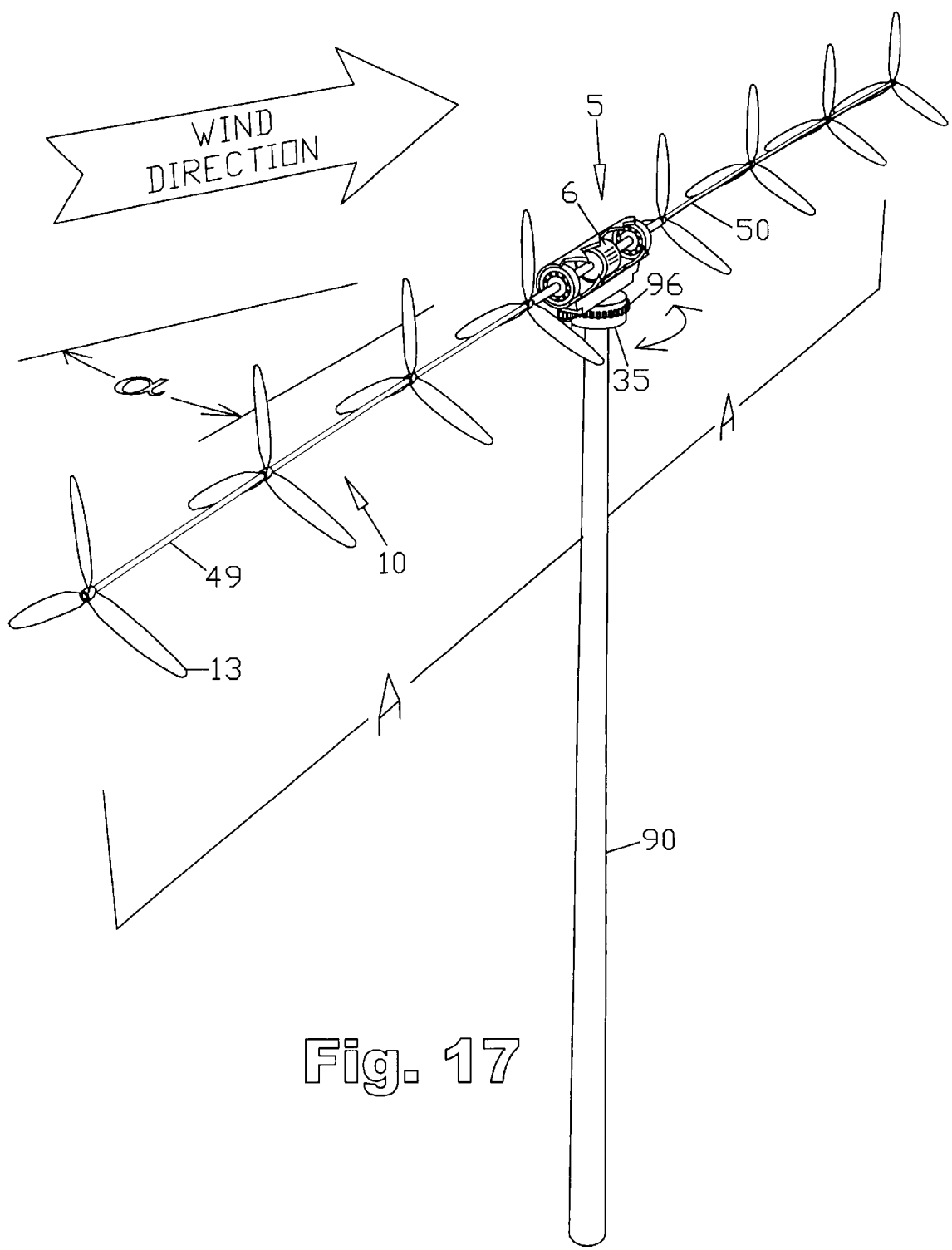
FIG. 17 Shows an oblique front view of the balanced, actively aimed wind turbine installation of the seventh embodiment, having a horizontal driveshaft with attached rotors, with an offset angle in the horizontal plane.

7. Seventh Embodiment: Balanced Driveshaft With Active Azimuthal Control, offset angle α is in the horizontal plane; FIG. 17:

In the seventh embodiment, the cantilevered bearing means and driveshaft are mounted substantially in the horizontal plane. As in the third embodiment, the aim of the driveshaft, as influenced by the directional rotation of azimuthal directional orientation means 35, is actively controlled by active azimuthal directional orientation control means 96, illustrated here as a simple gear drive.

In this case the offset angle α is in the horizontal plane. The amount of offset angle may be tailored to prevailing wind conditions; In moderate winds the offset angle α may be adjusted to provide maximum power, maximizing the windflow to each rotor, by reducing the wind shadow effect from one rotor to the next. In excessively strong winds, the offset angle α may be reduced, even to zero, placing the series of rotors more in line with the wind, so that they tend to shield one another from the full force of the wind, preventing overspeed, and thereby limiting damage from high winds.

Figure 18:
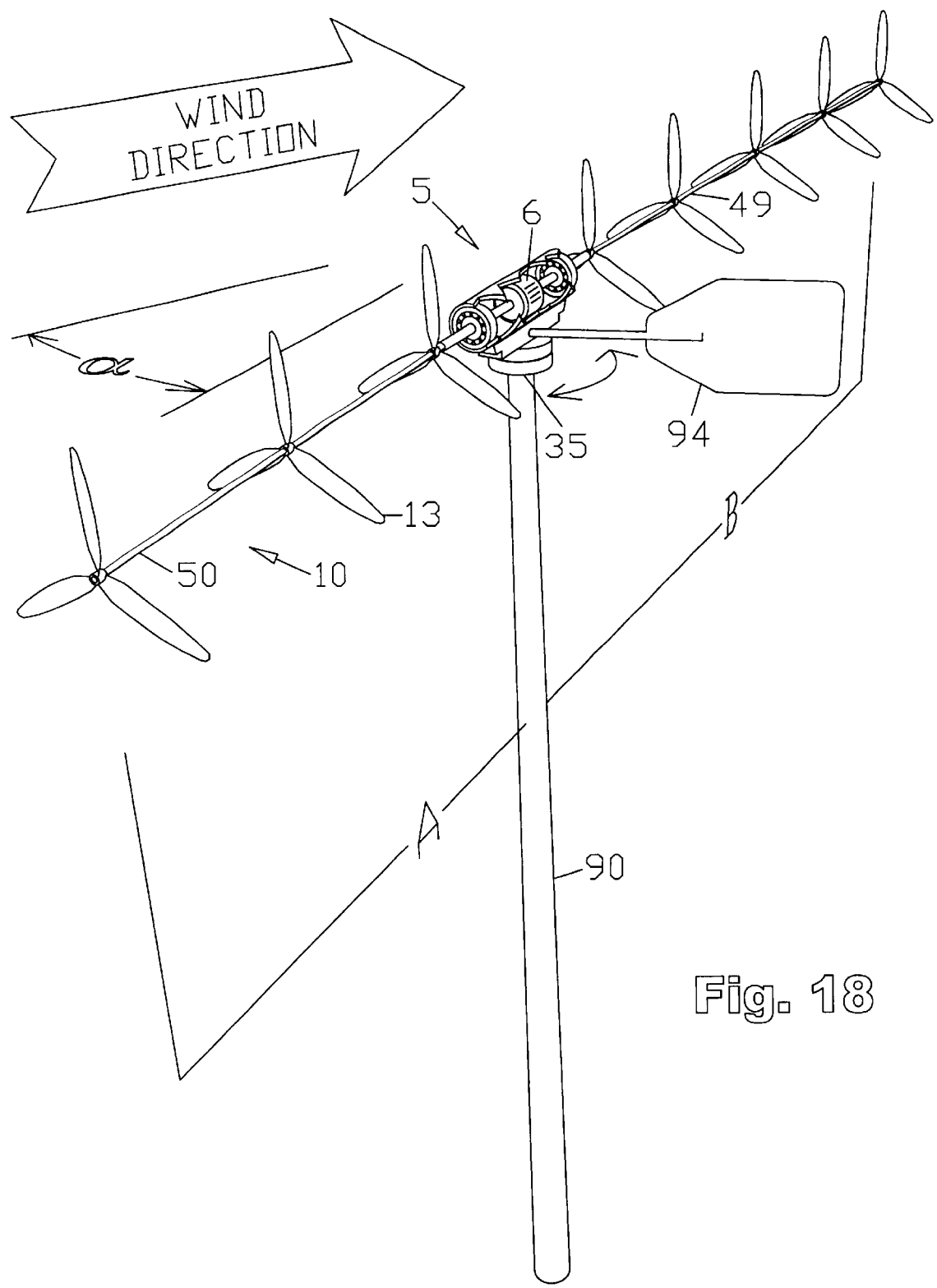
FIG. 18 Shows an oblique front view of the passively aimed wind turbine installation of the eighth embodiment, having a horizontal driveshaft with attached rotors, with an offset angle in the horizontal plane, as determined by a fluid reactive offset angle inducing means.

8. Eighth Embodiment: Downwind, Self-orienting Horizontal Driveshaft with Passively determined offset angle α in the horizontal plane; FIG. 18:

In the eighth embodiment, like the seventh, the driveshaft 10 is substantially horizontal, with the offset angle α being in the horizontal plane. In this case, however, the offset angle α is passively determined by a fluid reactive offset angle inducing means 94, illustrated as a simple fin, or paddle, attached to the azimuthal directional orientation means 35. This simple paddle, or fin, tends to be blown downwind, causing the assembly to which it is attached, including the driveshaft 10, to become offset from the wind direction, to a point where the offset force is balanced by the counteracting force of the downwind section of the driveshaft and its attached rotors undergoing their natural, downwind, self-orienting, weathervane-like behavior. The size and angle of the fin 94 are adjusted to provide maximum power, allowing each rotor to receive a substantial portion of fresh wind, substantially undisturbed by upwind rotors.

Figure 6:
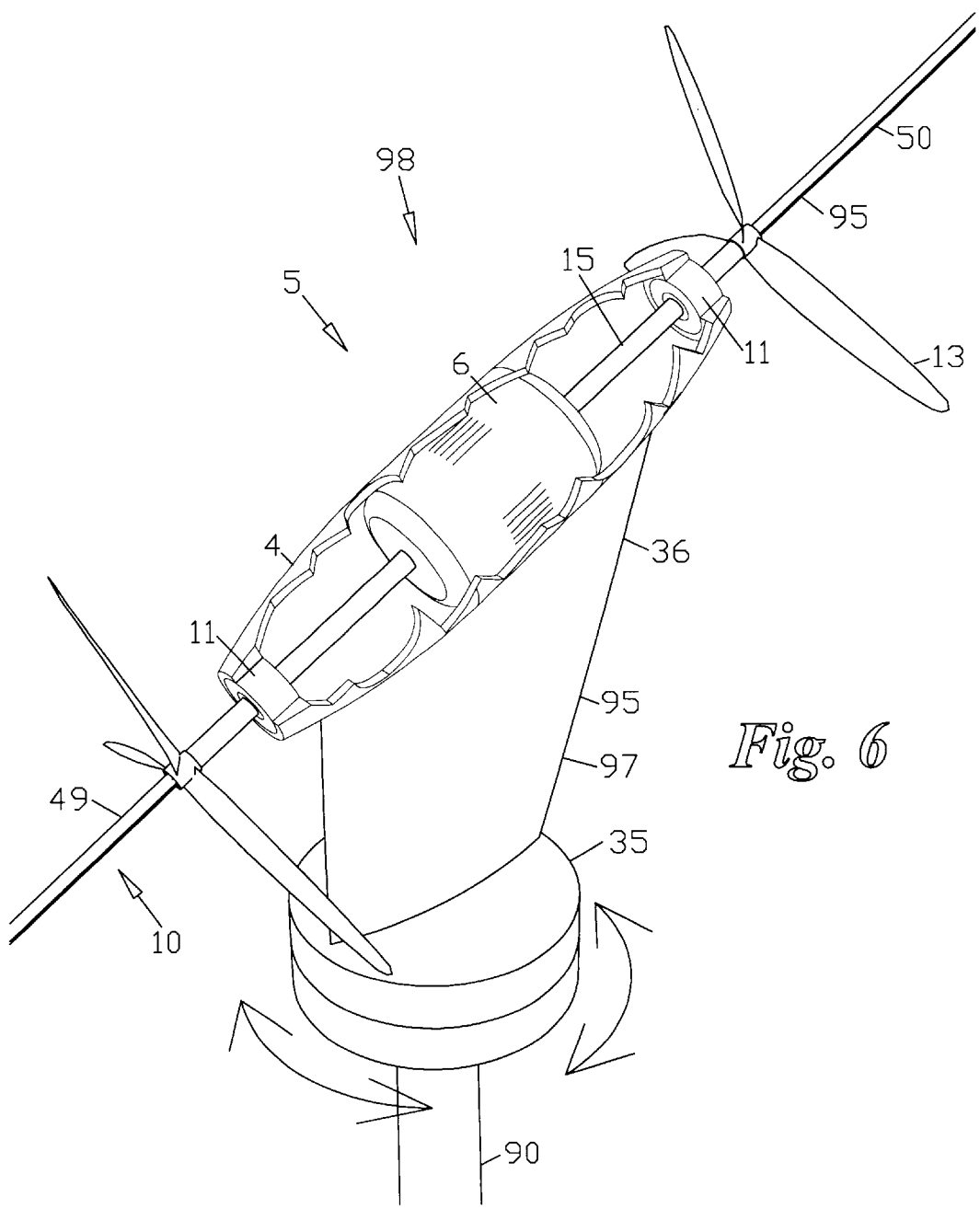
FIG. 6 Shows a closeup view of the streamlined nacelle of the ninth embodiment, mounted atop a streamlined pylon, which is itself mounted atop a turntable type pivot.

9. Ninth Embodiment: Streamlined, Aerodynamic Nacelle; FIG. 6:

The previous embodiments have shown the bearing support means 4 as a simple tube, to convey the mechanical essence of the invention, the possible simplicity of construction, and to show continuity with previously disclosed embodiments in the prior U.S. patent application Ser. No. 09/881,511. In actual practice, a more aerodynamic streamlined nacelle 98 serves to reduce the interference of the bearing support means 4, the load 6, and associated apparatus, with the wind. FIG. 6 illustrates a more aerodynamic bearing support means 4, that, being tapered at each end, serves as a nacelle, reducing aerodynamic drag and thereby reducing aerodynamic interference with the rotors. The nacelle shown also serves as the bearing support means 4, but could alternatively comprise a simple fairing, within the scope of this embodiment. In addition, a streamlined mounting pylon 97 serving as elevation angle control means 36, and at least partially serving as downwind offset extension means 95, is also aerodynamically shaped, to further reduce wind drag and interference. This streamlined pylon 97 is mounted atop horizontally rotatable azimuthal directional orientation means 35.

10. Tenth Embodiment: Horizontally Rotatable Azimuthal Directional Orientation Means 35 located within Aerodynamic Mounting pylon 97; FIGS. 1, 2, 3, 4:

In previous embodiments the horizontally rotatable azimuthal directional orientation means 35 is illustrated as a turntable-like unit, to most effectively illustrate its function. In this embodiment, otherwise similar to the previous, ninth embodiment, this horizontally rotatable azimuthal directional orientation means 35 comprises a substantially vertical, cylindrical unit housed within the aerodynamically shaped mounting pylon 97. Such a vertical, cylindrical unit may fit neatly over the top of a vertical, substantially cylindrical tower, as illustrated, and effectively serve as a pivot about the vertical axis.

Figure 1:
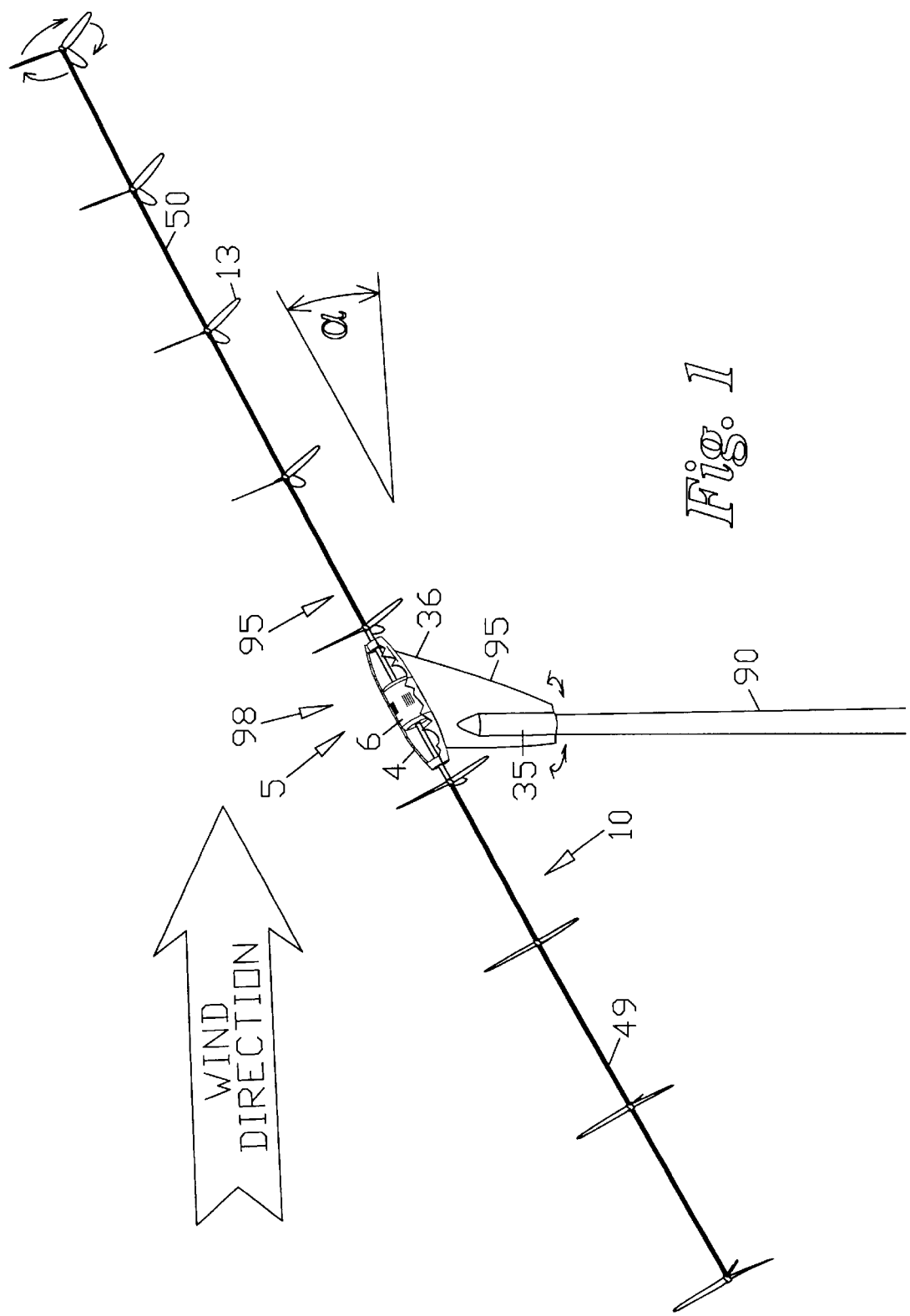
FIG. 1 Shows an oblique side view of a passively aimed wind turbine installation of the tenth embodiment, having a streamlined nacelle, and a streamlined mounting pylon.

FIG. 1 is an oblique perspective side view.

Figure 2:
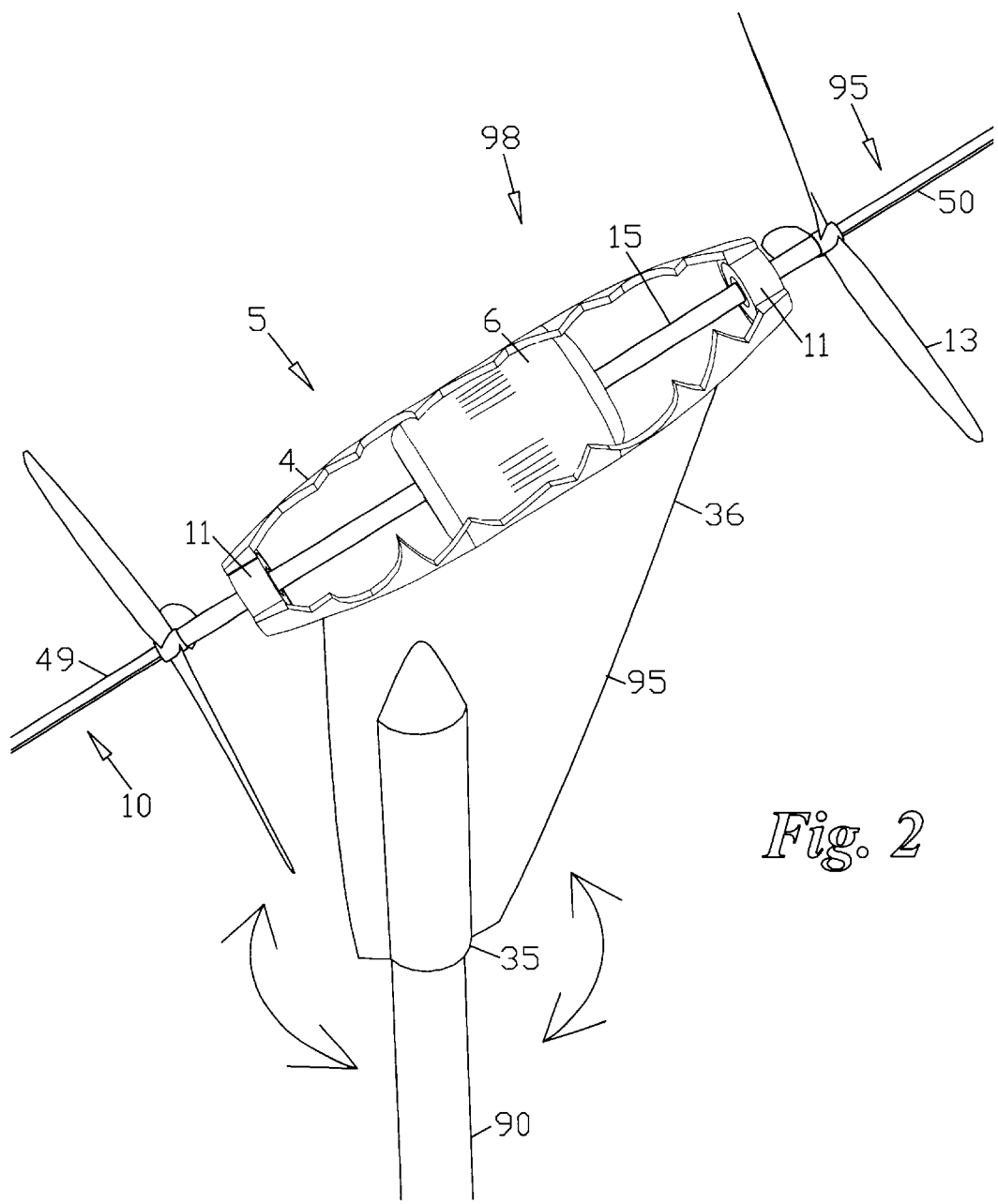
FIG. 2 Shows a closeup view of the streamlined nacelle of the tenth embodiment.

FIG. 2 is a closeup of the streamlined nacelle 98.

Figure 3:
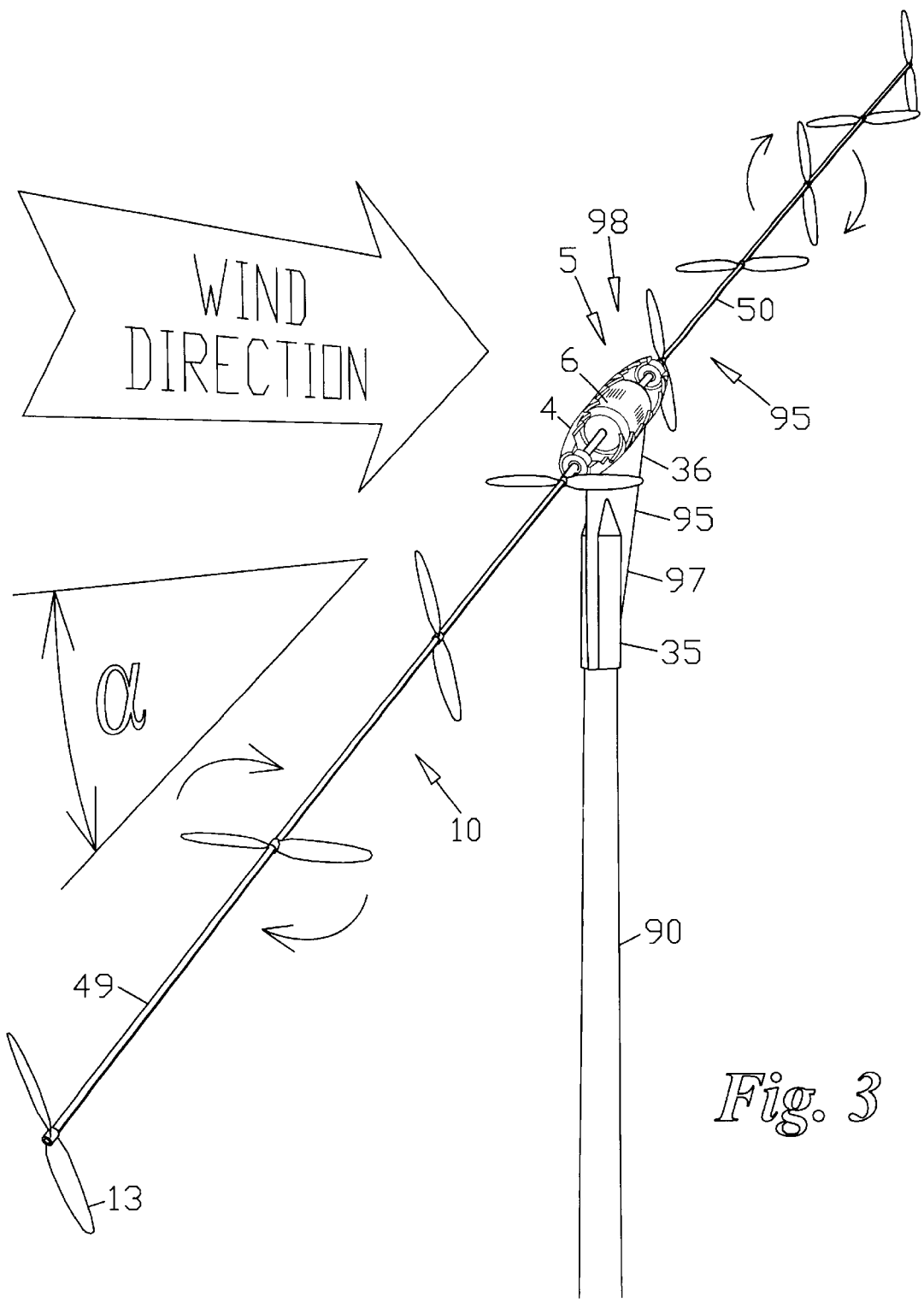
FIG. 3 Shows an oblique front view of a version of the tenth embodiment having two-bladed rotors, sequentially offset at 90 degrees.

FIG. 3 shows a version having two-bladed rotors, sequentially offset by 90 degrees. Such a two-bladed rotor configuration may be equally applied to all embodiments disclosed herein. Any reasonable number of rotor blades are possible, within the scope of this invention, for the rotors of all embodiments disclosed herein.

FIG. 4 attempts to approximately illustrate the manner in which the offset angle α allows each rotor to encounter at least some fresh wind substantially undisturbed by upwind rotors. In this respect, FIG. 4 is applicable to all embodiments disclosed herein. Note that with the offset angle in the vertical plane, with the driveshaft and attached rotors tilted forward, the wind is deflected slightly downward by the rotors.

Figure 5:
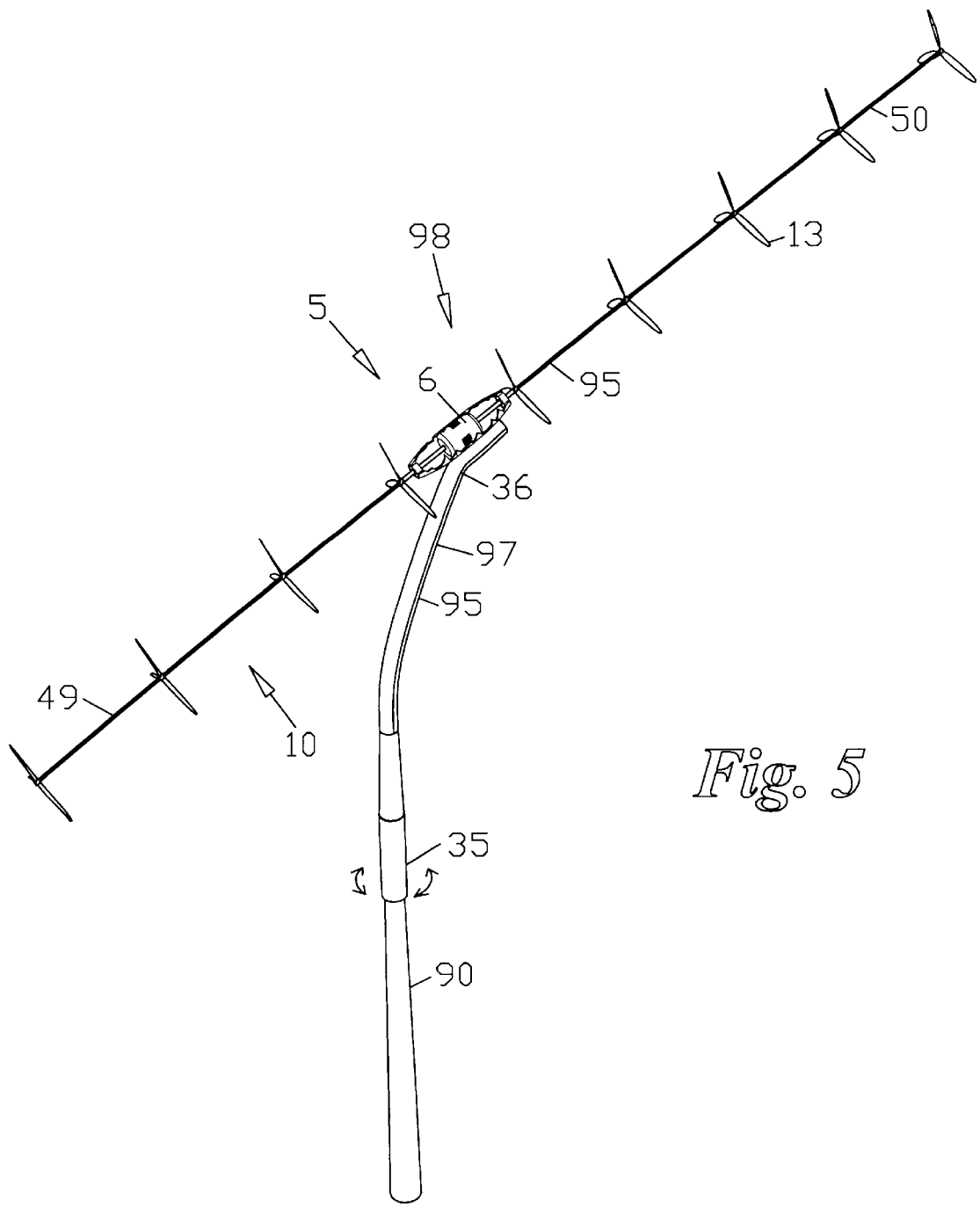
FIG. 5 Shows an oblique side view of the eleventh embodiment, wherein the tower 90 is split into two sections, an upper section and a lower one. The upper section of tower is offset and rotates, making this a passively aimed, downwind machine.

11. Eleventh Embodiment: Upper Section of Tower is Offset and Rotates; FIG. 5:

In this passively aimed, downwind embodiment, the tower 90 is split into two sections, an upper section and a lower one. The upper section fits over the lower one and is free to coaxially rotate thereabout. This rotatable interface, which may include bearings for smooth rotation, is essentially a pivot about the vertical axis, and comprises the horizontally rotatable azimuthal directional orientation means 35. Above this interface, the tower diverts from the vertical, thereby comprising downwind offset extension means 95. Still further up the tower, just before its supporting attachment to the cantilevered bearing means 5 housed within the aerodynamic nacelle 98, the tower bends further, with this final angle comprising elevation angle control means 36. Since this upper section of the tower rotates with the wind direction, it may be aerodynamically shaped, or include a fairing means (not shown).

What is claimed is:

1. A wind turbine, comprising:
   a series of substantially horizontal axis type rotors attached in a substantially coaxial manner at spaced intervals along a driveshaft;
   said driveshaft aimed sufficiently parallel to the wind for the rotors to effectively harness the wind, but at an offset angle from the wind direction, sufficient to allow an admixture of fresh wind, substantially undisturbed by upwind rotors, to each rotor;
   said driveshaft held in a rotationally free, cantilevered manner, by a cantilevered bearing means from which it projects;
   wherein at least part of said driveshaft projects from said cantilevered bearing means substantially toward the wind.

2. The wind turbine of claim 1 wherein said cantilevered bearing means is disposed substantially midway along said driveshaft.

3. The wind turbine of claim 1, wherein said bearing means is disposed sufficiently toward one end of said driveshaft that the other end of said driveshaft, with its attached rotors, is caused to be blown substantially downwind of said bearing means, so that said wind turbine is caused to become aimed substantially into the wind, in the manner of a weathervane.

4. The wind turbine of claim 2 wherein said bearing means is supported by a downwind offset extension means, which serves to provide an offset distance from said bearing means to a horizontally rotatable azimuthal directional orientation means, about which said extension means, said bearing means, and said driveshaft with attached rotors are free to rotate as a unit in the horizontal plane, in the manner of a weathervane.

5. The windmill of claim 1 further comprising an active aiming mechanism, whereby the directional aim of said driveshaft is determined.

6. The wind turbine of claim 1 wherein said offset angle is in the vertical plane.

7. The wind turbine of claim 1 wherein said offset angle is in the horizontal plane.

8. The wind turbine of claim 1 wherein said offset angle is oblique.

9. A wind turbine comprising:
   a cantilevered bearing means;
   an upwind section of a driveshaft, projecting from one end of said cantilevered bearing means, supported thereby in a substantially rotationally free manner;
   a series of substantially horizontal axis rotors attached at spaced intervals to said upwind section of said driveshaft in a substantially coaxial manner;
      each said rotor consisting of:
         a substantially coplanar set of blades, and;
         means for attaching said substantially coplanar set of blades to said driveshaft;
   whereby when said rotor is spinning, said substantially coplanar set of blades sweeps through a substantially disc shaped region, said rotor extracting a substantial portion of the power available from whatever wind passes through said disc shaped region;
   wherein:
      said driveshaft projects in a direction sufficiently parallel to the wind for said attached rotors to effectively harness the wind and thereby cause rotation of said section of said driveshaft;
      said rotors are axially separated by a sufficient distance to allow an admixture of at least some fresh wind, substantially undisturbed by upwind rotors, to enter the wind stream passing through each rotor.

10. The wind turbine of claim 9, further comprising:
   a downwind section of said driveshaft, extending from the other end of said cantilevered bearing means, supported thereby in a substantially rotationally free manner;
   a series of substantially horizontal axis rotors attached at spaced intervals to said downwind section of said driveshaft in a substantially coaxial manner.

11. The wind turbine of claim 10, wherein said upwind section and said downwind section of said driveshaft are divided one from the other, the upwind section of said driveshaft driving one half of a load, and said downwind section driving the other half of the load in the opposite direction, so that the two halves of the load are counterrotating, effectively substantially doubling the effective relative rate of rotation of the load.

12. A wind turbine comprising:
   a cantilevered bearing means;
   an upwind section of a driveshaft, projecting from one end of said cantilevered bearing means, supported thereby in a substantially rotationally free manner;
   a series of substantially horizontal axis rotors attached at spaced intervals to said upwind section of said driveshaft in a substantially coaxial manner;
   wherein:
   said driveshaft projects in a direction sufficiently parallel to the wind for said attached rotors to effectively harness the wind and thereby cause rotation of said section of said driveshaft;
   said rotors are separated by a sufficient distance to allow an admixture of at least some fresh wind, substantially undisturbed by upwind rotors, to enter the wind stream passing through each rotor;
   the direction of projection of said driveshaft is at an offset angle from the wind direction, sufficient to allow a substantial part of the disk swept by each rotor to encounter a stream of air substantially undisturbed by upwind rotors.

13. The wind turbine of claim 12, further comprising:
   a downwind section of said driveshaft, extending from the other end of said cantilevered bearing means, supported thereby in a substantially rotationally free manner;

a series of substantially horizontal axis rotors attached at spaced intervals to sad downwind section of said driveshaft in a substantially coaxial manner.

14. A wind turbine, comprising:

an elongate driveshaft;

a plurality of substantially horizontal axis type rotors;

a cantilevered bearing means;

a load;

means for allowing a substantially consistent region of the disk swept by each said rotor to encounter a substantially constant influx of fresh wind, substantially undisturbed by upwind rotors;

said substantially consistent region does not rotate with the upwind rotor;

wherein:

said driveshaft is supported in a rotationally free manner by said bearing means, projecting therefrom in two opposing directions;

said rotors are mounted to said driveshaft in a substantially coaxial manner, at axially spaced intervals therealong;

said load is configured and disposed in a manner whereby it is driven by the rotation of said driveshaft;

said driveshaft is disposed sufficiently parallel to the wind that said attached rotors are driven by the wind to cause said shaft to rotate about its own longitudinal axis; wherein all corresponding blades of each rotor disposed radially the same direction and perendicular to the axis of the driveshaft.

15. The wind turbine of claim 14, wherein said means for allowing a substantially consistent region of the disk swept by each said rotor to encounter a substantially constant influx of fresh wind comprises:

a sufficient axial distance between said rotors to allow a substantial admixture of said fresh wind into the wind stream encountered by each said rotor.

16. A wind turbine, comprising:

an elongate driveshaft;

a plurality of substantially horizontal axis type rotors;

a cantilevered bearing means;

a load;

means for allowing a substantial portion of the disk swept by each said rotor to encounter fresh wind, substantially undisturbed by upwind rotors;

wherein:

said driveshaft is supported in a rotationally free manner by said bearing means, projecting therefrom in two opposing directions;

said rotors are mounted to said driveshaft in a substantially coaxial manner, at spaced intervals therealong;

said load is configured and disposed in a manner whereby it is driven by the rotation of said driveshaft;

said driveshaft is disposed sufficiently parallel to the wind that said attached rotors are driven by the wind to cause said shaft to rotate about its own longitudinal axis; wherein said means for allowing a substantial portion of the disk swept by each said rotor to encounter fresh wind comprises:

an offset angle means that causes said driveshaft to be disposed at an offset angle from the exact wind direction.

17. The wind turbine of claim 16, wherein said means for allowing a substantial portion of the disk swept by each said rotor to encounter fresh wind further comprises:

sufficient distance between said rotors to allow substantial admixture of fresh wind into the wind stream encountered by each said rotor.

18. The wind turbine of claim 17, wherein said offset angle is in the vertical plane, as determined by an elevation angle control means.

19. The wind turbine of claim 17, wherein said offset angle is in the horizontal plane.

20. The wind turbine of claim 17, wherein said offset angle is oblique.

21. The wind turbine of claim 17, further comprising:

a horizontally rotatable azimuthal directional orientation means;

a downwind offset extension means;

whereby:

said downwind offset extension means allows said turbine to be blown sufficiently downwind of said horizontally rotatable azimuthal directional orientation means that said wind turbine is caused to be passively aimed sufficiently parallel to the wind that said rotors are caused thereby to rotate, rotating said shaft.

22. The wind turbine of claim 21, wherein said downwind offset extension means comprises a horizontally offset interface between said azimuthal directional orientation means and said cantilevered bearing means.

23. The wind turbine of claim 21, wherein said downwind offset extension means comprises a difference in length between the downwind section of said driveshaft and the upwind section of said driveshaft.

24. The wind turbine of claim 21, wherein said downwind offset extension means comprises a preponderance of rotors on the downwind section of said driveshaft.

25. The wind turbine of claim 21, wherein said downwind offset extension means comprises a preponderance of aggregate distance of downwind rotors over that of upwind rotors, from said azimuthal directional orientation means, giving said downwind rotors a perponderance of leverage as compared to that of said upwind rotors, sufficient that said downwind section is caused by the wind to be blown to a substantially downwind position, whatever the wind direction, thereby causing said upwind section of said driveshaft to be aimed substantially into the wind, making this turbine a passively aimed machine, that is self aiming in the fashion of a weathervane.

26. The wind turbine of claim 21, wherein said downwind offset extension means comprises a preponderance of aggregate leverage of downwind rotors over that of upwind rotors, from said azimuthal directional orientation means, sufficient that said downwind section is caused by the wind to be blown to a substantially downwind position, whatever the wind direction, thereby causing said upwind section of said driveshaft to be aimed substantially into the wind, making this turbine a passively aimed machine, that is self aiming in the fashion of a weathervane.

27. The wind turbine of claim 26, wherein the upwind section of said driveshaft further comprises a counterweight means to balance against the force exerted by said preponderance of aggregate leverage of downwind rotors and said downwind section of driveshaft.

* * * * *